(12) United States Patent
Bishop

(10) Patent No.: US 10,830,029 B2
(45) Date of Patent: Nov. 10, 2020

(54) EQUIPMENT, SYSTEM AND METHOD FOR DELIVERY OF HIGH PRESSURE FLUID

(71) Applicant: MGB OILFIELD SOLUTIONS, L.L.C., Houston, TX (US)

(72) Inventor: Mark Daniel Bishop, Katy, TX (US)

(73) Assignee: MGB OILFIELD SOLUTIONS, LLC, Katy, TX (US)

( * ) Notice: Subject to any disclaimer, the term of this patent is extended or adjusted under 35 U.S.C. 154(b) by 246 days.

(21) Appl. No.: 15/977,519

(22) Filed: May 11, 2018

(65) Prior Publication Data

US 2018/0328157 A1 Nov. 15, 2018

Related U.S. Application Data

(60) Provisional application No. 62/617,164, filed on Jan. 12, 2018, provisional application No. 62/505,066, filed on May 11, 2017.

(51) Int. Cl.
*E21B 43/26* (2006.01)
*F04B 17/06* (2006.01)
(Continued)

(52) U.S. Cl.
CPC ............. *E21B 43/26* (2013.01); *F04B 17/05* (2013.01); *F04B 17/06* (2013.01); *F04B 47/02* (2013.01); *F04B 53/22* (2013.01); *B60P 3/00* (2013.01)

(58) Field of Classification Search
CPC . B60P 3/00; B60P 3/22; B62D 53/065; E21B 43/26; F04B 17/05; F04B 17/06; F04B 47/02; F04B 53/22
(Continued)

(56) References Cited

U.S. PATENT DOCUMENTS 2,611,496 A * 9/1952 Martin ................. B62D 53/065
414/537
2,766,701 A * 10/1956 Giraudeau .............. F04B 53/14
417/568

(Continued)

FOREIGN PATENT DOCUMENTS

AU    2010201760    11/2010
WO    WO2015103626   7/2015

OTHER PUBLICATIONS

PCT Notification of Transmittal of the International Search Report and the Written Opinion of the International Searching Authority, or the Declaration; dated Jul. 23, 2018; International Application No. PCT/US18/032339; International Searching Authority, United States Patent and Trademark Office.

(Continued)

*Primary Examiner* — Patrick Hamo
*Assistant Examiner* — Joseph S. Herrmann
(74) *Attorney, Agent, or Firm* — The Compton Law Firm, P.C.; Scott D. Compton

(57) ABSTRACT

The application is directed to a system and method for hydraulic fluid delivery including the delivery of high pressure fluid in hydraulic fracturing operations. The system of this application is operationally configured to reduce the footprint at a well site and, in one aspect, includes a towable platform carrying a power sub-assembly, a pump sub-assembly and a cooler sub-assembly each of which is releasably attachable to the platform. Each sub-assembly may be removed from the platform without disturbing the relationship between the platform and the remaining sub-assemblies attached thereto.

17 Claims, 20 Drawing Sheets

(51) Int. Cl.
  *F04B 17/05* (2006.01)
  *F04B 53/22* (2006.01)
  *F04B 47/02* (2006.01)
  *B60P 3/00* (2006.01)

(58) Field of Classification Search
  USPC ............ 280/837, 838, 441.2, 417.1; 417/231
  See application file for complete search history.

(56) References Cited

U.S. PATENT DOCUMENTS

| | | | |
|---|---|---|---|
| 4,311,395 A | 1/1982 | Douthitt | |
| 5,839,888 A * | 11/1998 | Harrison | F04B 1/02 |
| | | | 417/521 |
| 7,007,966 B2 * | 3/2006 | Campion | B60P 3/00 |
| | | | 123/2 |
| 7,845,413 B2 * | 12/2010 | Shampine | E21B 43/267 |
| | | | 166/369 |
| 7,921,914 B2 * | 4/2011 | Bruins | E21B 43/26 |
| | | | 166/177.5 |
| 8,506,267 B2 * | 8/2013 | Gambier | F04B 17/05 |
| | | | 417/244 |
| 8,789,601 B2 | 7/2014 | Broussard et al. | |
| 8,925,640 B2 * | 1/2015 | McCoige | A62C 27/00 |
| | | | 169/13 |
| 2009/0308602 A1 | 12/2009 | Bruins et al. | |
| 2010/0068071 A1 * | 3/2010 | Bowden | B66F 11/044 |
| | | | 417/16 |
| 2014/0096974 A1 | 4/2014 | Coli et al. | |
| 2015/0027712 A1 | 1/2015 | Vicknair et al. | |
| 2015/0322761 A1 | 11/2015 | Hodgson et al. | |
| 2016/0177678 A1 | 6/2016 | Morris et al. | |
| 2017/0114625 A1 * | 4/2017 | Norris | E21B 43/26 |
| 2018/0328157 A1 * | 11/2018 | Bishop | E21B 43/26 |

OTHER PUBLICATIONS

Bishop, Claims 1-15 of International Application No. PCT/US18/032339; May 11, 2018.

* cited by examiner

EQUIPMENT, SYSTEM AND METHOD FOR DELIVERY OF HIGH PRESSURE FLUID

CROSS-REFERENCE TO RELATED APPLICATIONS

This application claims benefit of U.S. Provisional Patent Application Ser. No. 62/505,066, filed on May 11, 2017, the content of which is hereby incorporated by reference in its entirety. This application also claims benefit of U.S. Provisional Patent Application Ser. No. 62/617,164, filed on Jan. 12, 2018, the content of which is hereby incorporated by reference in its entirety.

STATEMENT REGARDING FEDERALLY SPONSORED RESEARCH OR DEVELOPMENT

Not applicable.

BACKGROUND OF THE INVENTION

The field of the application relates generally to pumping operations and high pressure fluid pumping operations used to stimulate production from an oil or gas well.

Hydraulic fracturing, sometimes called "fracing" or "fracking" is a process for increasing the flow of oil or gas from a well. Fracking typically involves pumping specific types of fluids into a well bore under pressures that are high enough to fracture an earthen formation. For certain fracking operations it may be necessary to pump a large volume of fluid into a well bore. For example, some fracking operations require the concurrent use of multiple fracturing fluid pumping units at a single well in order to provide the requisite demand of fracturing fluid into the well bore for fracturing the earthen formation.

Common hydraulic fracturing fluid pumping units include trailer or skid mounted units equipped with a single diesel motor, driveline and a single pump. Trailer and skid mounted hydraulic fracturing fluid pumping units are typically quite long and are often difficult to maneuver at a well site. In addition, the weight of such units sometimes requires special operating permits for transport on roads and highways. Moreover, trailer or skid mounted hydraulic fracturing fluid pumping units currently in use are complex in design rendering such units difficult and/or expensive to operate, monitor, and repair. Overcoming such shortcomings is desired.

SUMMARY OF THE INVENTION

The present application is directed to a mobile hydraulic fluid delivery system including (1) a chassis having a perimeter framework providing a support surface on a first side of the chassis; (2) a tow connection pivotally attached to a front end of the chassis between a vertical position and a non-vertical position; (3) a power sub-assembly located on the support surface and releasably securable to the chassis; (4) a pump sub-assembly located on the support surface and releasably securable to the chassis; and (5) a cooling sub-assembly located on the support surface and releasably securable to the chassis; wherein each of the sub-assemblies may be removed from the chassis in isolation.

The present application is also directed to a mobile hydraulic fluid delivery system including a chassis, a power sub-assembly releasably securable to the chassis, a pump sub-assembly releasably securable to the chassis and a cooler sub-assembly releasably securable to the chassis, wherein the power sub-assembly includes an engine and transmission, the pump sub-assembly includes a high pressure pump and the cooler sub-assembly includes a plurality of radiators including at least one radiator located above the power sub-assembly and at least one radiator located above the pump sub-assembly.

The present application is also directed to a mobile hydraulic fluid delivery system including (1) a towable platform defined by a front end, a rear end, a right side and a left side; (2) a first sub-assembly releasably securable to the platform, the first sub-assembly including at least an engine and a transmission in operable communication; (3) a second sub-assembly releasably securable to the platform, the second sub-assembly including a high pressure pump, wherein the second sub-assembly is in operable communication with the first sub-assembly; and (4) a third sub-assembly releasably securable to the platform, the third sub-assembly including a plurality of radiators in operable communication with the first and second sub-assemblies; wherein the second sub-assembly and third sub-assembly are about equidistant from the rear end of the platform; wherein at least part of the third sub-assembly is nearer the front end of the platform than the second sub-assembly; and wherein at least part of the third sub-assembly is near the front end of the platform than part of the first sub-assembly.

DETAILED DESCRIPTION OF THE INVENTION

Figure 1:
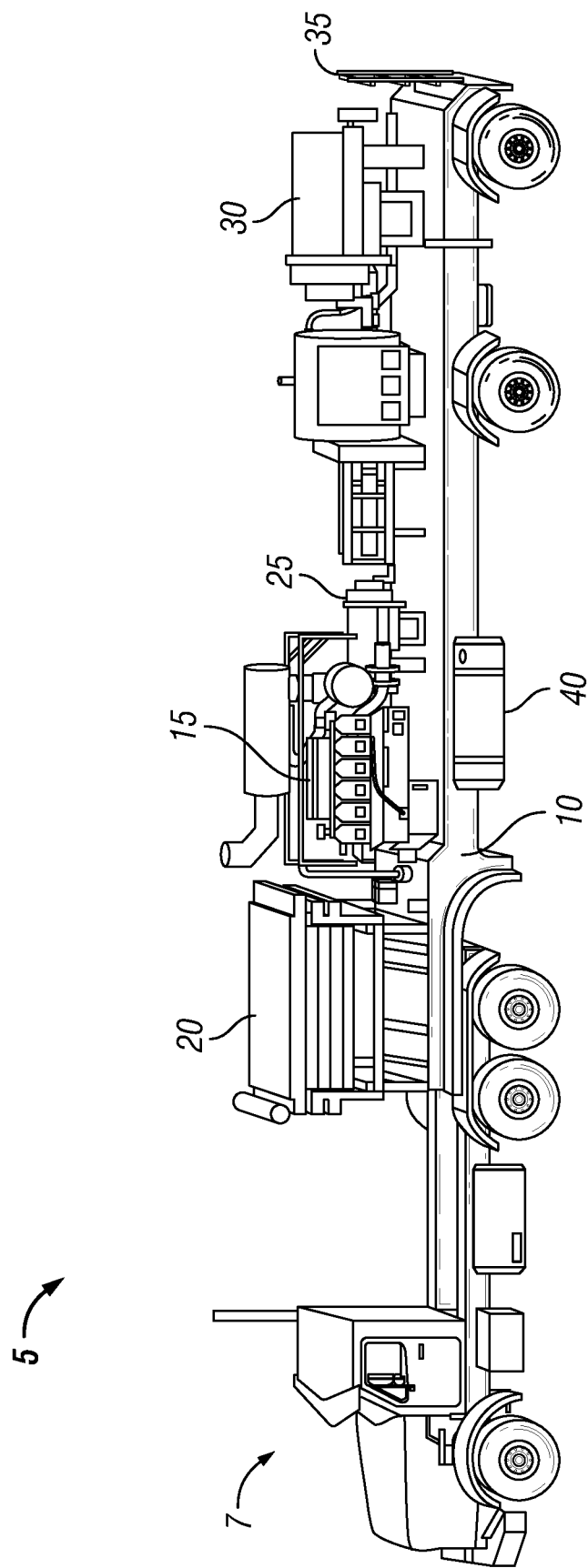
FIG. 1 is side perspective view of an exemplary prior art trailer mounted hydraulic fracturing fluid pumping unit.

Before describing the invention in detail, it is to be understood that the present invention is not limited to particular embodiments. It is also to be understood that the terminology used herein is for the purpose of describing particular embodiments only, and is not intended to be limiting.

Approximating language, as used herein throughout the specification and claims, may be applied to modify any quantitative representation that could permissibly vary, without resulting in a change in the basic function to which it is related. Accordingly, a value modified by a term or terms, such as "about", is not limited to the precise value specified. In some instances, the approximating language may correspond to the precision of an instrument for measuring the value. The terms "first," "second," and the like, herein do not denote any order, quantity, or importance, but rather are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur. This distinction is captured by the terms "may" and "may be", or "can" or "can be".

As used in this specification and the appended claims, the phrases "data acquisition and control center," "data van" and like phrases refer to a centralized command center to control all critical well site equipment while monitoring, recording and supervising the fracturing treatment. As understood by the skilled artisan, a "data van" is typically located at the site of hydraulic fracturing. The combination of various equipment used for hydraulic fracturing of a well is typically referred to in the industry as a "spread," "fracturing spread" or "frac spread" and such may be used herein interchangeably. General details regarding hydraulic fracturing and the equipment used can be found in a large number of references including, for example, U.S. Pat. No. 3,888,311, entitled "Hydraulic Fracturing Method," issued on Jun. 10, 1975, and United States Patent Application Publication Number 20120085541, entitled "Method and apparatus for hydraulically fracturing wells," published on Apr. 12, 2012, each of which is incorporated herein by reference in its entirety. The phrase "trailer or skid mounted hydraulic fracturing fluid pumping system" may be used interchangeably with phrases such as "hydraulic fluid delivery system." "transportable pumping system," "fracturing pump" and "frac pump." Herein, a plurality of frac pumps in use at a well site may be referred to collectively as a "frac pump sub-system." As understood by the skilled artisan, the acronym "ISO" refers to the International Organization for Standardization, Geneva, Switzerland. The phrase "center of gravity" is the point at which the entire weight of a body may be considered as concentrated so that if supported at this point the body would remain in equilibrium in any position.

In one aspect, the application provides a hydraulic fluid delivery system including a mobile or transportable support platform. In another embodiment, the hydraulic fluid delivery system may include a permanent installation.

In another aspect, the application provides a mobile fluid delivery system including a quick release engine module.

In another aspect, the application provides a mobile fluid delivery system including a novel fuel tank configuration.

In another aspect, the application provides a mobile fluid delivery system shorter in length than similar equipment commercially available at the time of this application.

In another aspect, the application provides a mobile fluid delivery system including a maintenance station operationally configured to house the various filters and separators.

In another aspect, the application provides a mobile hydraulic fluid delivery system with a radiator located at a point closer to the pump of the system than the motor of the system.

In another aspect, the application provides a mobile hydraulic fluid delivery system with a chassis carrying a pump and radiator arranged in a vertical orientation and having a transmission located at a point between the radiator and the engine.

In another aspect, the application provides a mobile fluid delivery system including (1) a first removable assembly comprising a support structure for holding an engine and transmission and (2) a second removable assembly comprising a support structure for holding a pump and a radiator.

In another aspect, the application provides a mobile fluid delivery system including a novel chassis design. The chassis has a novel fold down access work platform disposed along one or both sides of the chassis for supporting persons thereon.

In another aspect, the present invention may be described as a hydraulic fluid delivery system including a chassis assembly having (1) a first support member, (2) a second support member releasably securable to the first support member and (3) a third support member releasably securable to the first support member, the second support member being operationally configured to carry a power source of the mobile hydraulic fluid delivery system and the third support member being operationally configured to carry a pump source of the mobile hydraulic fluid delivery system. The third support member may also be operationally configured to carry at least a radiator of a cooling system of the mobile hydraulic fluid delivery system.

In another aspect, the present application is directed to a fluid delivery system for pumping fluid into an underground well bore at a well site including a mobile pumping assembly that is transportable between multiple well sites and other locations as desired.

In another aspect, the present application is also directed to a mobile hydraulic fracturing pump assembly including a novel chassis design providing for the novel placement of various assembly members about the chassis in a manner effective to minimize the size of the chassis.

In another aspect, the present application is also directed to a system for delivering hydraulic fracturing fluid to one or more wells, the system including a mobile hydraulic fracturing pump assembly effective for pumping fluid into an underground well bore at a well site.

In another aspect, the present application is directed to a method for providing hydraulic fracturing fluid to one or more wells at a well site, the method including providing one or more sources of fracturing fluid; providing a mobile hydraulic fluid delivery system including (1) a chassis having a perimeter framework providing a support surface on a first side of the chassis; (2) a tow connection pivotally attached to a front end of the chassis between a vertical position and a non-vertical position; (3) a power sub-assembly located on the support surface and releasably securable to the chassis; (4) a pump sub-assembly located on the support surface and releasably securable to the chassis; and (5) a cooling sub-assembly located on the support surface and releasably securable to the chassis; wherein each of the sub-assemblies may be removed from the chassis in isolation; and delivering fracturing fluid to one or more wells by operation of the mobile hydraulic fluid delivery system.

In another aspect, the present application is directed a mobile hydraulic fluid delivery system including a transportable support platform carrying a power sub-assembly having an engine and a transmission, a pump sub-assembly having a high pressure pump and a cooling sub-assembly having a plurality of radiators located at an elevated position above the platform wherein at least one radiator is located above the high pressure pump and wherein at least one radiator may be located above the transmission.

Figure 2:
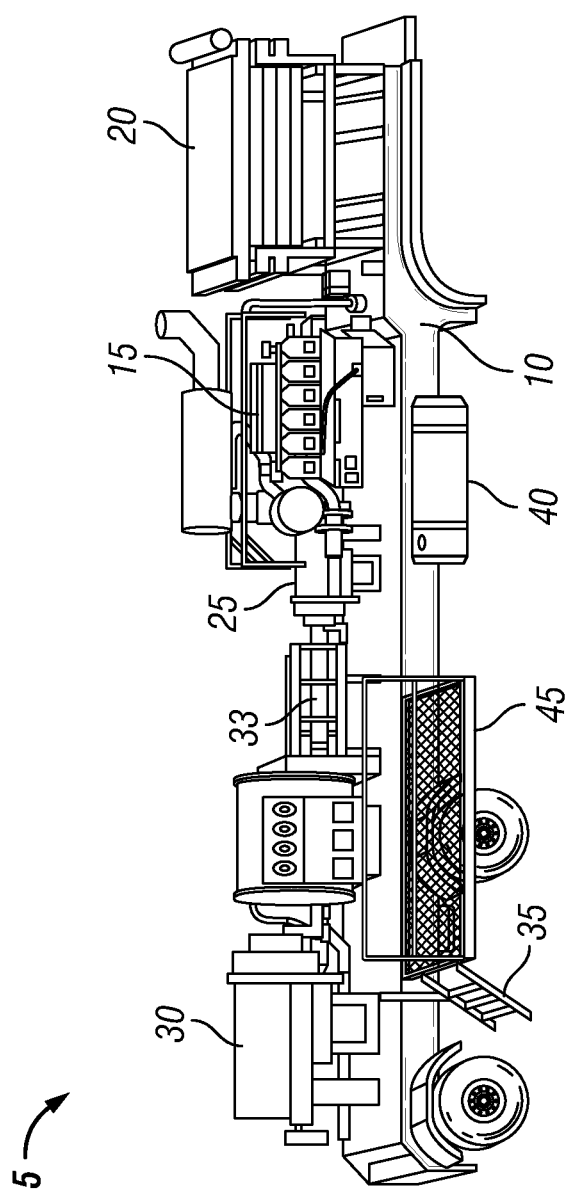
FIG. 2 is a perspective view of an exemplary prior art trailer mountable hydraulic fracturing fluid pumping unit.

Exemplary illustrations of prior art hydraulic fluid delivery units 5 ("unit 5") releasable attachable to semi-trucks (hereafter "truck(s) 7") are provided in FIGS. 1 and 2. A common unit 5 includes a trailer chassis 10 supporting various operable frac pump equipment. For example, a common chassis 10 is typically provided with a pump drive train including a high horsepower engine 15, a transmission 25 in communication with a high pressure positive displacement pump 30 via a drive shaft 33, a high ambient radiator 20, a step ladder 35 and a fuel tank 40 mounted to the side of the chassis 10. Known units 5 may also include one or more access platforms 45 as shown in FIG. 2. As understood by persons of ordinary skill in the art of hydraulic fracturing operations, each unit 5 requires either a truck 7 equipped with a power take off ("PTO") or an alternative engine to start the engine 15.

Common unit 5 construction includes a radiator 20 near the front of the chassis 10 at a point between the engine 15 and a truck 7 towing the unit 5. The rear of the chassis 10 typically supports the pump 30 and fold down step ladder 35 or the like for access atop the chassis 10. As such, a common commercially available unit 5 includes a chassis 10 with a length and width defined by the size and location of the radiator 20, the engine 15, the transmission 25, the drive shaft 33 and the pump 30 along the chassis 10. In the United States of America, this particular unit 5 layout is due, at least in part, to the Department of Transportation requirements regarding the Federal Bridge Gross Weight Formula.

It is common in hydraulic fracturing operations to fracture a well with ten to twenty stages of fracturing treatment. The total amount of fluid pumped under high pressure may be as high as about nineteen million liters or more (158730 barrels or more). Depending on the particular fracturing operation, fracturing equipment can be operated across a range of different pressures and injection rates that are specific to a particular well. On the high end of the spectrum, the pressure used for hydraulic fracturing may be as high as 103421250 pascal (15,000 psi) and the injection rate could be as much as 15898.7 liters (100 barrels) per minute. As such, currently available commercial units 5 typically include a 2,500 horsepower ("hp") trailer-mounted pumper utilizing, for example, a Quintuplex plunger pump powered by a 2,500 hp rated engine, e.g., Caterpillar® 3512C, Caterpillar® TH55-E90 transmission. Such units 5 typically include a stand-alone (wet-kit) hydraulic system to provide fluid power to operate the H2O shear and starting of the engine.

Examples of commercially available prior art units 5 include, but are not necessarily limited to the FT-2251 Trailer Mounted Fracturing United available from Stewart & Stevenson, Houston, Tex., U.S.A.; the Q10 Pumping Unit available from Halliburton, Houston, Tex., U.S.A.; and the Mobile Frac Pump Stimulation Unit available from Dragon Products, LTD, Beaumont, Tex., U.S.A. Such units 5 typically include a chassis 10 constructed from steel, e.g., high tensile AS14-T1 steel, with a three axle air ride suspension and may weigh from about 40,000.00 kg up to about 60,000.00 kg (from about 88,184.00 pounds up to about 132,277.00 pounds). Many known commercially available units 5 include the dimensions as listed in Table 1 or very similar dimensions.

TABLE 1

| Height: | about 4.27 meters (about 14.0 feet) |
| Width: | about 3.81 meters (about 8.5 feet) |
| Length: | about 13.4 meters (about 44.0 feet) |

The invention of the present application is drawn to a mobile hydraulic fluid delivery system dimensionally smaller and lighter than commercially available prior art units 5 described above. In addition, the hydraulic fluid delivery system of the present application is effective to reduce manufacturing cost, reduce transportation costs, facilitate the removal and addition of component parts and equipment, reduce repair time and cost, improve inspection or monitoring of the system, reduce fuel costs, improve fluid lines employed, and minimize the amount of equipment employed at a well site during fracturing operations. Although the present application is discussed in terms of a mobile hydraulic fluid delivery system, in other implementations the system discussed herein may be provided as a nitrogen pumping system, a cement pumping system, a matrix stimulation pumping system, a carbon dioxide ("CO2") pumping system, as well as used in other high pressure fluid delivery settings. Persons of ordinary skill in the art of pumps will recognize any modifications that may be required for any particular type of system and its intended use.

Figure 3:
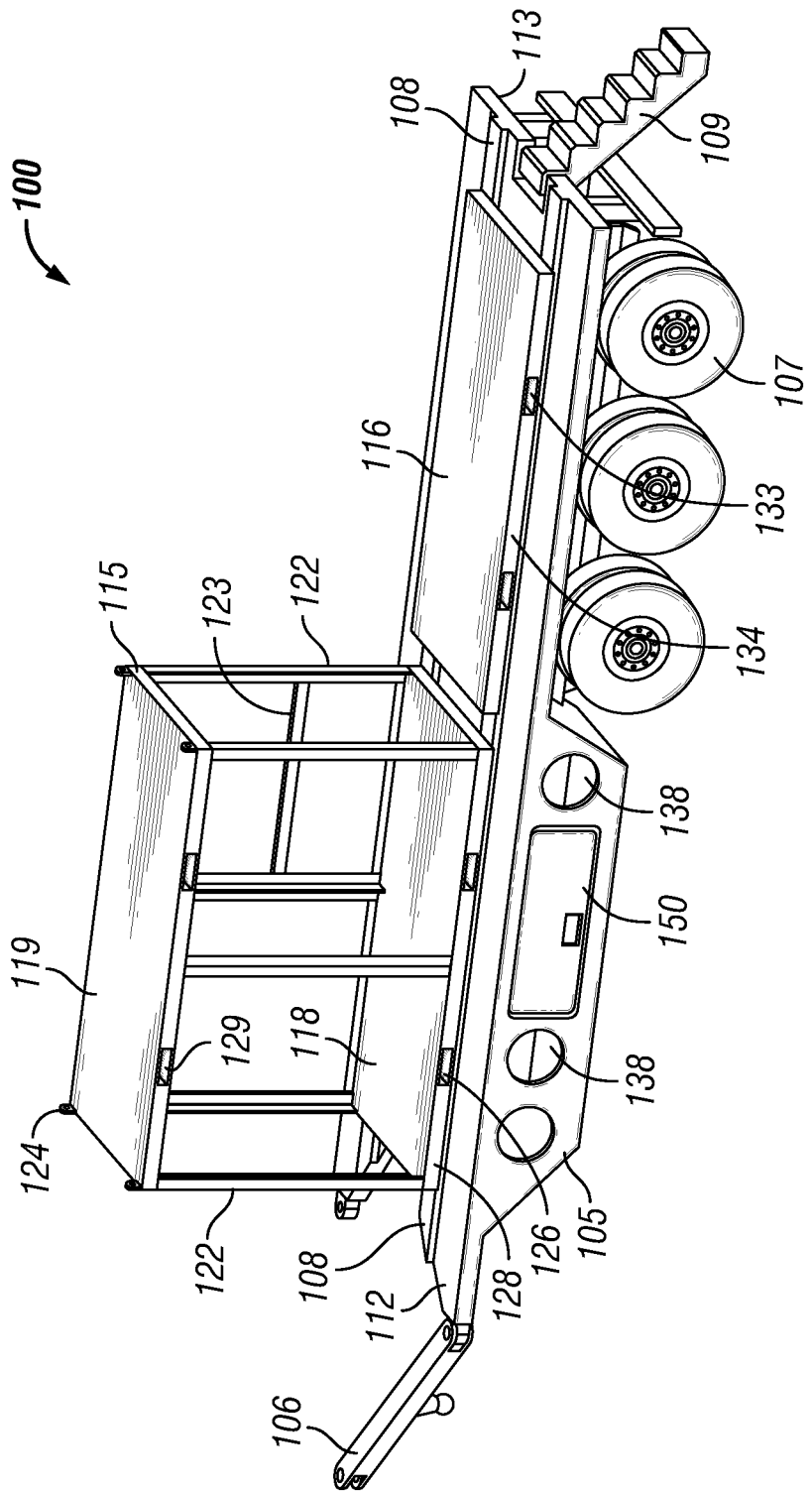
FIG. 3 is a perspective view of an embodiment of a chassis assembly of the present application.
Figure 4:
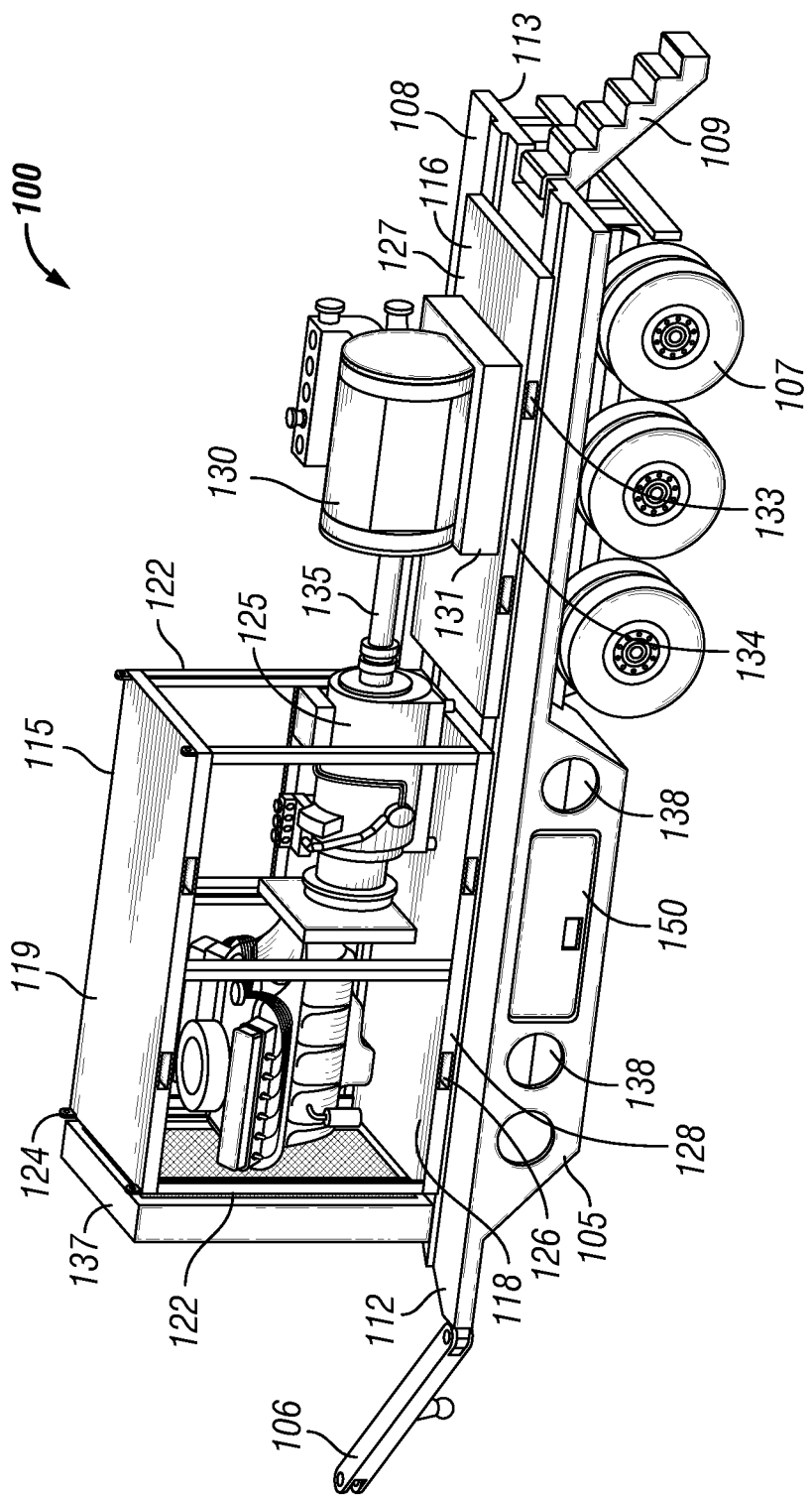
FIG. 4 is a perspective view of the chassis assembly of FIG. 3 further including equipment such as an engine, transmission and a high pressure pump.
Figure 5:
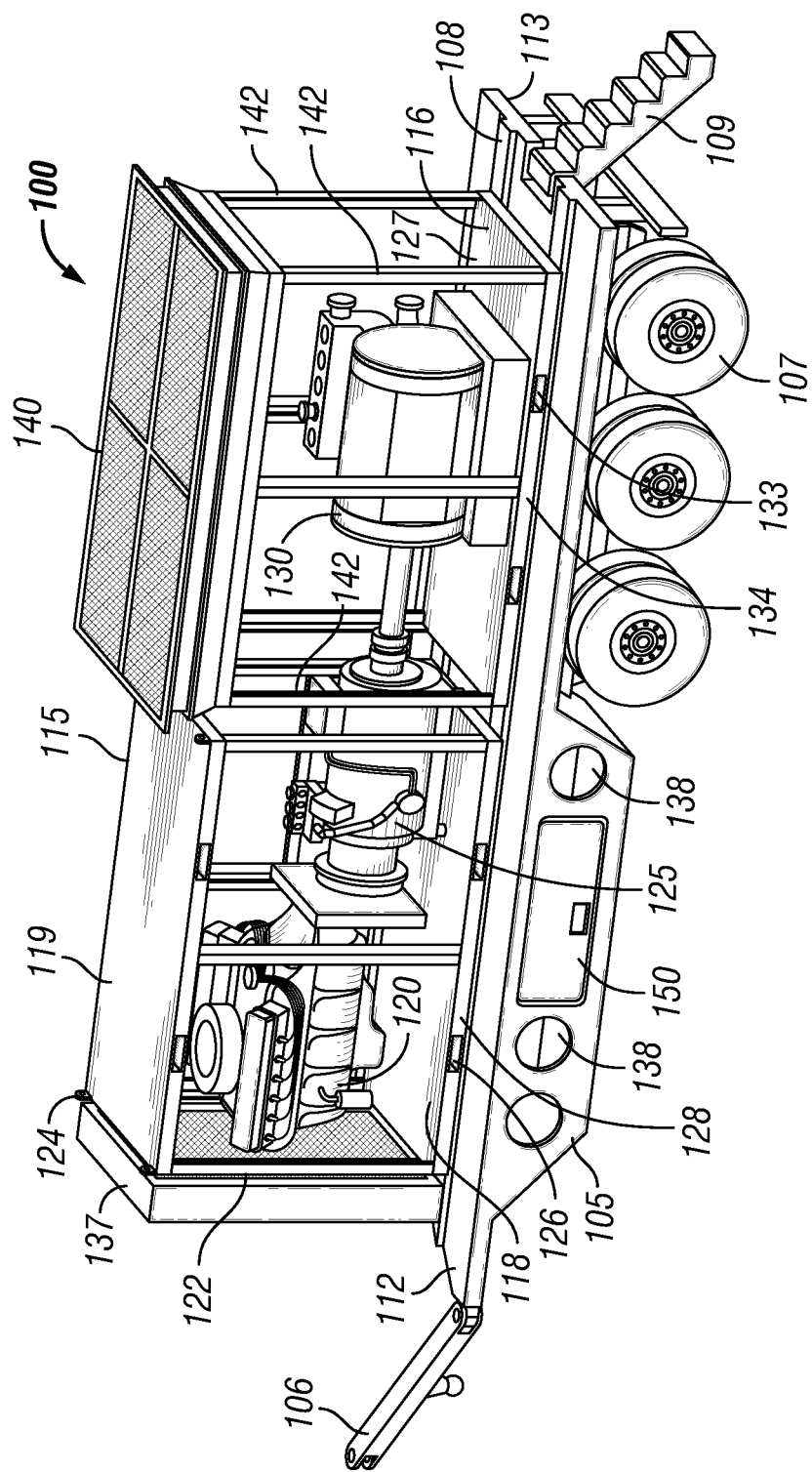
FIG. 5 is a perspective view of an embodiment of a mobile hydraulic fluid delivery system of the present application.

With reference to the simplified illustrations of FIGS. 3-5, one exemplary mobile hydraulic fluid delivery system ("system 100") of the present application includes a transportable platform or towable platform including, but not necessarily limited to a chassis 105 type member equipped with a either a two axle, three axle or four axle configuration with an air ride suspension system, an anti-skid braking ("ABS") system and tires 107 for transport of the system 100. The chassis 105 of this embodiment includes a first side defined by a support surface 112 providing a flatbed type configuration operationally configured to carry various operably equipment. For ease of installation and removal, an opposing second side 113 of the chassis 105 suitably includes cradle type devices for receiving corresponding axle beams in attachment thereto although other connections are herein contemplated. In addition, the system 100 may include a tire inflation system to help keep tires 107 properly inflated. Suitable axle configurations and/or tire inflation systems are commercially available from Meritor, Inc., Troy, Mich., U.S.A.

In one embodiment, the support surface 112 may be provided as a substantially planar type surface for holding equipment thereon via nut/bolts, straps, tie down cords, and the like. In another embodiment, the support surface 112 may be provided with an increased surface area by including one or more raised surfaces and/or one or more recessed surfaces along the support surface 112 in one or more arrangements relative the shape of the support surface 112. For example, the support surface 112 may include (1) one or more raised seat members 108 disposed along the support surface 112 at a distance equal to or less than the length of the support surface 112 as seen in FIG. 3 and/or (2) one or more recessed areas disposed along the support surface 112 and/or one or more recessed grooves or channels disposed lengthwise along the support surface 112 at a distance equal to or less than the length of the support surface 112. The one or more raised seat members 108 and one or more channels may be employed for increasing the surface area of the support surface 112 for purposes of securing one or more items thereto and/or receiving items in slidable communication thereto. As shown, the one or more raised seat members 108 decrease the contact surface area for items supported thereon. Although the system 100 of this application may be built to scale, for typical hydraulic fracturing operations the one or more raised seats 108 may include a height from about 2.0 cm to about 20.0 cm (about 0.78 inches to about 7.87 inches) and a width from about 4.0 cm to about 50.0 cm (about 1.57 inches to about 19.68 inches). Suitable channels may include a depth, width and length as desired for receiving objects in a mated position. In another embodiment, a chassis 105 may also include one or more open sections providing one or more openings through the support surface 112 of the chassis 105.

Still referring to FIGS. 3 and 4, the chassis 105 also suitably includes a tow connection 106 at or near a forward part of the chassis 105 for releasable attachment to a truck 7 or other vehicle and a stairway 109 such as a pivotal, retractable and/or removable stairway, step ladder, or the like providing access to the chassis 105 from ground level. One suitable tow connection 106 may be removably and pivotally attachable to the chassis 105 including, but not limited to hingedly attachable to the chassis 105. Another suitable tow connection 106 may be removably attachable to the chassis 105 in a fixed position. Another suitable tow connection 106 may be permanently fixed to the chassis 105. One suitable stairway 109 may be located at one or more points along the chassis 105 for ease of access to the support surface 112 and/or work platform 170 as described below. In this embodiment, a stairway 109 may be pivotally connected at the rear of the chassis 105 providing for adjustment of the stairway 109 between an operable down position as shown in FIG. 3 to an upright position when stored or when the system 100 is in transit. To assist in minimizing the overall weight of the system 100, the body of the chassis 105 may also include one or more weight reducing through holes or cavities (hereafter "cut outs 138") operationally configured to minimize the weight of the chassis 105 without compromising the structural integrity of the chassis 105. One or more cut outs 138 may be located along the chassis 105 as desired or as otherwise may be required to minimize the weight of the chassis 105 while maintaining the structural integrity of the chassis 105. Without limiting the cut outs 138 to any particular form, suitable cut outs 138 may be provided as (1) cavities within the body of the chassis 105 and/or (2) apertures through the body of the chassis 105. In addition, suitable cut outs 138 may each have a size and/or shape as desired or as may otherwise may be required to minimize the weight of the chassis 105 without compromising the structural integrity of the chassis 105.

Still referring to FIGS. 3 and 4, in one embodiment the system 100 may be comprised of a plurality of support members and operable frac pump equipment supported by and secured to the various support members. In particular, the system 100 may include a first support member (hereafter "chassis 105") operationally configured to hold at least a second support member (hereafter "first sub-assembly 115") removably attachable to a forward part of the chassis 105 and a third support member (hereafter "second sub-assembly 116") removably attachable to a rear part of the chassis 105. As discussed below, one exemplary first sub-assembly 115 may be operationally configured to hold an engine 120 and a corresponding transmission 125 thereon. Likewise, one exemplary second sub-assembly 116 may be operationally configured to support a corresponding high pressure pump 130 or high pressure pump assembly thereon. Another exemplary second sub-assembly 116 may be operationally configured to support two or more high pressure pumps 130 thereon. As further discussed below, the first and second sub-assemblies 115, 116 may be secured to the chassis 105 via one or more quick release type connections. Without limiting the invention, the first sub-assembly 115 and its operable equipment may be referred to herein as a "power sub-assembly" and the second sub-assembly 116 and its operable equipment may be referred to herein as a "pump sub-assembly." As such, a novel feature of the present invention is the ability to secure the power sub-assembly and pump sub-assembly to the chassis 105 via quick disconnect connectors and thereafter remove one or both of the power sub-assembly and the pump sub-assembly on-site during fracturing operations without having to remove the entire system 100 from the wellsite for repair or maintenance of particular system 100 components. The modularity of the present system 100 allows individual support members 105, 115, 116 to be removed and/or replaced without having to remove and/or replace the other support members of the system 100.

In one embodiment, whereby the chassis 105 operates as a first platform of the system 100, the first and second sub-assemblies 115, 116 may be regarded as second and third platforms of the system 100. As shown in FIG. 3, at least one of the first and second sub-assemblies 115, 116 may include a box frame assembly or box frame of one-piece configuration including a skid type support platform. For example, the first sub-assembly 115 may be provided as a box frame configuration and the second sub-assembly 116 may be provided as a skid type support platform. As further shown in this embodiment, each of the first and second sub-assemblies 115, 116 are suitably supported atop parallel raised seats 108 and are releasably attachable to the chassis 105 via a quick disconnects. In another embodiment, each of the first and second sub-assemblies 115, 116 may be releasable attached to the raised seats 108 via fasteners, e.g., nut/bolt type fasteners, mated with threaded bolt holes disposed along the raised seats 108. As such, the present system 100 effectively improves or reduces the amount of time required to service its operable equipment, e.g., the engine 120, the transmission 125, pump 130, cooling system including at least a first radiator 140, amongst other parts. For example, a first sub-assembly 115, supporting an engine 120 and transmission 125 thereon, may be removed from the chassis 105 in about three hours compared to twenty-four (24) to forty-eight (48) hours necessary to remove an engine 15 from a chassis 10 of the prior art of FIGS. 1 and 2. The reduced installation time facilitates hydraulic fracturing operations by minimizing down time of individual systems 100.

One suitable box frame configuration may include a first platform 118 and a second platform 119 set apart from the first platform 118 via one or more first support members 122. In the simplified embodiment of FIG. 3, the first sub-assembly 115 has a total of six vertical first support members 122. As further shown in FIG. 3, a first sub-assembly 115 may include one or more non-vertical frame supports such as one or more horizontal frame supports 123 interconnecting various vertical first support members 122 and/or one or more diagonal frame supports interconnecting various vertical first support members 122 as is common in box frame construction. In still another embodiment, a first sub-assembly 115 may include one or more side walls or partitions effective for providing added frame support to the first sub-assembly 115 as well as covering operable equipment housed therein for safety purposes and/or aesthetics. As discussed below, the system 100 may also include a plenum box adjacent the front side of the first sub-assembly 115 releasably secured to the chassis 105 and/or the first sub-assembly 115.

With reference to FIG. 4, a suitable first platform 118 may include a planar type configuration having a first surface for engaging at least part of the support surface 112 and a second surface for supporting at least an engine 120 and transmission 125 thereon. Suitably, an engine 120 and transmission 125 are mounted to the first platform 118 and/or one or more first support members 122 and/or horizontal frame supports 123 via bolts, U-bolts, latches, and combinations thereof.

In one particular embodiment, quick disconnect connectors for securing the first sub-assembly 115 to the support surface 112 may include flatbed twistlocks, which are also commonly referred to by persons skilled in the art of trailers as "ISO container" locks or ISO corner fittings and twist locks similar as used on freight containers and the like. For example, twistlocks may be used to secure the four corners of the first platform 118 to the support surface 112. Suitable corner fittings and twist locks are commercially available from sources including, but not necessarily limited to TANDEMLOC, Inc., Havelock, N.C., U.S.A. In another particular embodiment, quick disconnect connectors for securing the first sub-assembly 115 to the support surface 112 may include bolt type fasteners to be inserted through corresponding apertures of the first sub-assembly 115 and the support surface 112. In another embodiment, the first sub-assembly 115 may include anchoring elements with apertures there through for receiving bolt type fasteners. In operation, a first sub-assembly 115 may be removed from the chassis 105 as a complete assembly or unit with the engine 120 and transmission 125 intact without having to disassemble the first sub-assembly 115. In another embodiment, the engine 120 and/or transmission 125 may be removed from the first sub-assembly 115 without removing the first sub-assembly 115 from the chassis 105.

The first platform 118 is not necessarily limited in width and length but suitably includes a width and length less than the support surface 112. The height of the first platform 118 may also vary but the height may be dependent on the inclusion of one or more features including, but not necessarily limited to a pair of forklift pockets 126 located therein for transporting the first sub-assembly 115 and/or one or more removable drip trays 128 effective to collect fluid from the engine 120 and/or transmission 125 and/or other spilled or leaked fluid. In one embodiment, except for spacing provided for forklift pockets 126 and/or any drip trays 128, the first platform 118 may be of solid construction. In another embodiment, for purposes of weight reduction the first platform 118 may include a hollow type interior with support framing disposed along the perimeter and/or disposed through the interior at one or more desired locations. In an embodiment including metal materials of construction, the first platform 118 may be attached to the first support members 122 via welds and/or bolt type fasteners.

In one embodiment the second platform 119 may be of similar construction as a corresponding first platform 118. In another embodiment, the second platform 119 may be different in construction from its corresponding first platform 118. One suitable second platform 119 may be provided as a table top type configuration including female type corner fittings operationally configured to receive the upper portion of the first support members 122 in a mated position via gravity. Once the second platform 119 is set in an operable position as shown in FIGS. 3 and 4, the second platform 119 may be further secured to the one or more first support members 122 via one or more bolt type fasteners for a quick release operation to disassemble the first sub-assembly 115. In another embodiment, the second platform 119 may be secured to the one or more first support members 122 via welds for permanent attachment of the second platform 119.

In addition to acting as an extra support surface and as a cover for the engine 120 and transmission 125, the second platform 119 may also include forklift pockets 129 therein for transporting the first sub-assembly 115. Also, the outer surface of the second platform 119 may include one or more lift eyes 124, handles, hook members, or the like for lifting and transporting the first sub-assembly 115 via lifting equipment including, but not necessarily limited to mechanical lifts such as various types of forklifts, overhead cranes and hoists using leg spreaders, e.g., four leg spreader, and the like. The embodiment of the second platform 119 as seen in FIGS. 3 and 4 is provided with a total of four lift eyes 124 at each of the four corners of the second platform 119. Persons of ordinary skill in the art will appreciate that in still another embodiment the second platform 119 may include ISO corner fittings as described above. Also, the frame of the first sub-assembly 115 may itself be used for lifting and transport purposes.

In operation, the first sub-assembly 115 is suitably releasable from the chassis 105 by disconnecting the quick disconnect connectors that secure the first sub-assembly 115 to the chassis 105. Also, the transmission 125 is disconnected from the high pressure pump 130 and the various fluid conduits of the system 100, e.g., hoses, connecting the engine 120 and/or transmission 125 to other operable components of the system 100 are suitably disconnected in a manner effective for a complete disconnect of the engine 120 and transmission 125 from the system 100 allowing the first sub-assembly 115 to be removed from the chassis 105 intact.

As shown in FIG. 4, the transmission 125 is operably communicated with the high pressure pump 130 via a drive shaft 135 extending from an attachment point with the transmission 125 on the first sub-assembly 115 to an attachment point with the high pressure pump 130 on the second sub-assembly 116 providing operable communication between the power sub-assembly and the pump sub-assembly as understood by the skilled artisan. As shown, the first and second sub-assemblies 115, 116 may be set apart a distance as desired. For hydraulic fracturing operations, the first and second sub-assemblies 115, 116 may be set apart at a distance up to about 500.0 cm (about 196.0 inches). In another embodiment, the first and second sub-assemblies 115, 116 may be set on the support surface 112 in an abutment position. Accordingly, a drive shaft 135 may include a length according to the distance between the transmission 125 and the high pressure pump 130.

Still referring to FIG. 4, the second sub-assembly 116 may include a first platform 127 configured similar as the first platform 118 described above including a pair of forklift pockets 133 located therein for transporting the second sub-assembly 116 and/or one or more removable drip trays 134 effective to collect fluid from (1) the high pressure pump 130 and/or (2) cooling system including one or more radiators 137, 140 and/or (3) other spilled or leaked fluid. As FIG. 4 further illustrates, an additional pump platform 131 may be provided as desired for properly aligning a particular high pressure pump 130 with a particular drive shaft 135 at a suitable elevation. In one embodiment, the pump platform 131 may be releasably attachable to a second sub-assembly 116 via one or more fasteners. In another embodiment, a second sub-assembly 116 may include a cavity or sunken surface for receiving at least part of the high pressure pump 130 therein. In another embodiment, a second sub-assembly 116 may be provided with a permanent raised second surface operable as a pump platform 131. In addition, the pump platform 131 may include an upper non-planar support surface for receiving one or more particular types of high pressure pumps thereon.

With further reference to FIG. 5, a novel design element of the present system 100 includes the placement of a cooling system including at least a first radiator 140 for the engine 120 near the rear of the chassis 105 as opposed to the front of the chassis 105 as found in the prior art. A jacket water cooler and hydraulic cooler may be included as part of the cooling system labeled 140. In this embodiment, the radiator 140 is positioned at a point above at least part of the high pressure pump 130 thereby decreasing the overall length of the chassis 105 compared to the length of a prior art chassis 10 as shown in FIGS. 1 and 2. For example, the system 100 of FIGS. 3-5 provides a chassis 105 from about 10.0 percent to about 30.0 percent shorter in length compared to the length of various commercially available chassis 10 designs. For example, a chassis 105 as shown in FIGS. 3-5 may be about 3.05 meters (about 10.0 feet) shorter than the embodiments of a prior art chassis 10 as shown in FIGS. 1 and 2.

In one embodiment, the second sub-assembly 116 may be provided as a box frame configuration operationally configured to support a radiator 140 atop of the second sub-assembly 116. As shown in the simplified embodiment of FIG. 5, a second sub-assembly 116 may include one or more vertical second support members 142 providing attachment surfaces for securing a radiator 140 at a position apart from the high pressure pump 130. In one embodiment, the one or more second support members 142 may include vertical leg type members set within cavities or other mating surfaces on the support surface 112. In another embodiment, the second support members 142 may include mounting plates at their base with one or more apertures there through for securing the second support members 142 to the support surface 112 via fasteners such as threaded fasteners. In another embodiment, the second support members 142 may be secured to the support surface 112 using interlocking piping configured to receive release pins there through, or the second support members 142 may be secured to the support surface 112 using a bolt and flange configuration. In another embodiment, a second sub-assembly 116 may be provided as a box frame including a platform or enclosure type surface for holding a radiator 140. In one suitable embodiment, the high pressure pump 130 may be mounted to the second sub-assembly 116 and/or pump platform 131 via bolts, U-bolts, latches, and combinations thereof.

In another embodiment, the radiator 140 may include a plurality of second support members 142 extending from the radiator 140 and corresponding to second support members 142 affixed to the support surface 112 of the chassis 105. Suitably, the second support members 142 of the radiator 140 are secured to the second support members 142 of the chassis 105 via one or more fasteners providing a set elevation of the radiator 140 up apart from the high pressure pump 130. Without limiting the invention, in one suitable embodiment the second support members 142 may be secured to the radiator 140 and/or the support surface 112 via welds, bolt type fasteners, and combinations thereof. Also, the corresponding second support members 142 of the radiator 140 and chassis 105 may include male/female type connectors at their connecting ends for securing the second support members 142. In another embodiment, the second support members 142 may include overlapping sections to be secured together. Suitable fasteners for securing of the second support members 142 include, but are not necessarily limited to release pins, bolt type fasteners, e.g., a single or double nut assembly, clamps, and combinations thereof.

In one suitable embodiment, the cooling system of the system 100 may include a horizontally aligned radiator 140 with a hydraulically driven fan and cooling circuits for engine coolant, an aftercooler, lubrication oil, fuel, and a hydraulic fan drive. In particular, the cooling system of the present system 100 may include a horizontal radiator 140 rated for cooling the engine 120 and transmission 125, in addition to ancillary cooling systems, allowing the system 100 to operate at an overall ambient operating temperature rating of about 45.0 degrees Celsius (about 135.0 degrees Fahrenheit). In another embodiment, the cooling system of the system 100 may include a vertically aligned radiator.

A suitable cooling system of the present system 100 may utilize one or more radiator core structures including, but not necessarily limited to removable tube type radiator cores, aluminum plate style radiator cores and/or industrial bolt on type radiator cores. In addition radiator cores, the radiator 140 may also include one or more radiator fan motors, either hydraulically driven or electrically driven. Suitably, the fan blade design of the cooling system will effectively optimize air flow over the radiator 140 to optimize cooling. In addition to commercially available radiator designs, the radiator 140 of this application suitably includes a pre-radiator filter member comprising a single or multiple sections or layers of filter medium such as synthetic polymers and/or the like housed within a frame member. e.g., a metal or plastic frame member. A suitable pre-radiator filter member may be located along the underside of a radiator 140, for example, within a housing along the underside of a radiator 140 effective as a first stage filter to reduce the amount of sand, dust, and/or other foreign substances that may otherwise be directed through the radiator 140 damaging or plugging the radiator 140 thereby reducing the coiling efficiency of the radiator 140.

As understood by the skilled artisan, known frac pump cooling systems typically require regular cleaning at a well site during fracturing operations. Cleaning operations for known radiators 20 typically involve using a dry CO2 cleaning mechanism or a high pressure washer to manually clean a radiator 20 and the radiator fins or cooling tubes. During certain climatic conditions such as strong winds, excessive atmospheric dust, rain, and the like, this type of regular cleaning event may be required at least once a week, each cleaning event lasting approximately one to two hours. The design of the present system 100 allows the cooling system to bypass the above described regular cleaning events or otherwise minimize the number of cleaning events performed by providing for the inspection and replacement of the pre-radiator filter member as necessary. For example, the radiator 140 of the present cooling system may only require a cleaning event once a month compared to once a week as required with known radiators 20. Without limiting the invention to any particular time period, in one suitable embodiment a pre-radiator filter member may be replaced in a time of about five minutes or less.

Referring again to FIG. 3, the design of the chassis 105 may also provide for one or more spaces or compartments within the body of the chassis 105 for housing one or more serviceable or mechanical components of the system 100 for ease of access (hereafter such space may be referred to as a "maintenance station 150"). One suitable maintenance station 150 may include an enclosure with a retractable cover accessible along the side of the chassis 105 at a point below the support surface 112 for housing items required for engine 120, transmission 125 and pump 130 operation, including, but not necessarily limited to, engine fuel filters, fuel/water separators, engine oil filters, transmission oil filters, pump lubricating oil filters, hydraulic reservoir oil filters, and air/water separators. One particularly advantageous feature of such a maintenance station 150 is the ability to service the system 100 during operation. For example, persons may perform one or more filter changes via a maintenance station 150 during system 100 operation. The system 100 may also include one or more maintenance stations 150 on the opposing side of the chassis 105 effective for storing one or more of the above described items and/or other items such as tools, spare parts, safety equipment such as fire extinguishers, flash lights, hard hats, and first aid kits. One suitable maintenance station 150 may comprise inner dimensions as listed in Table 2 below.

TABLE 2

| | |
|---|---|
| Height: | about 50.0 cm (about 19.68 inches) |
| Width: | about 200.0 cm (about 78.74 inches) |
| Depth: | about 30.0 cm (about 11.81 inches) |

Figure 6:
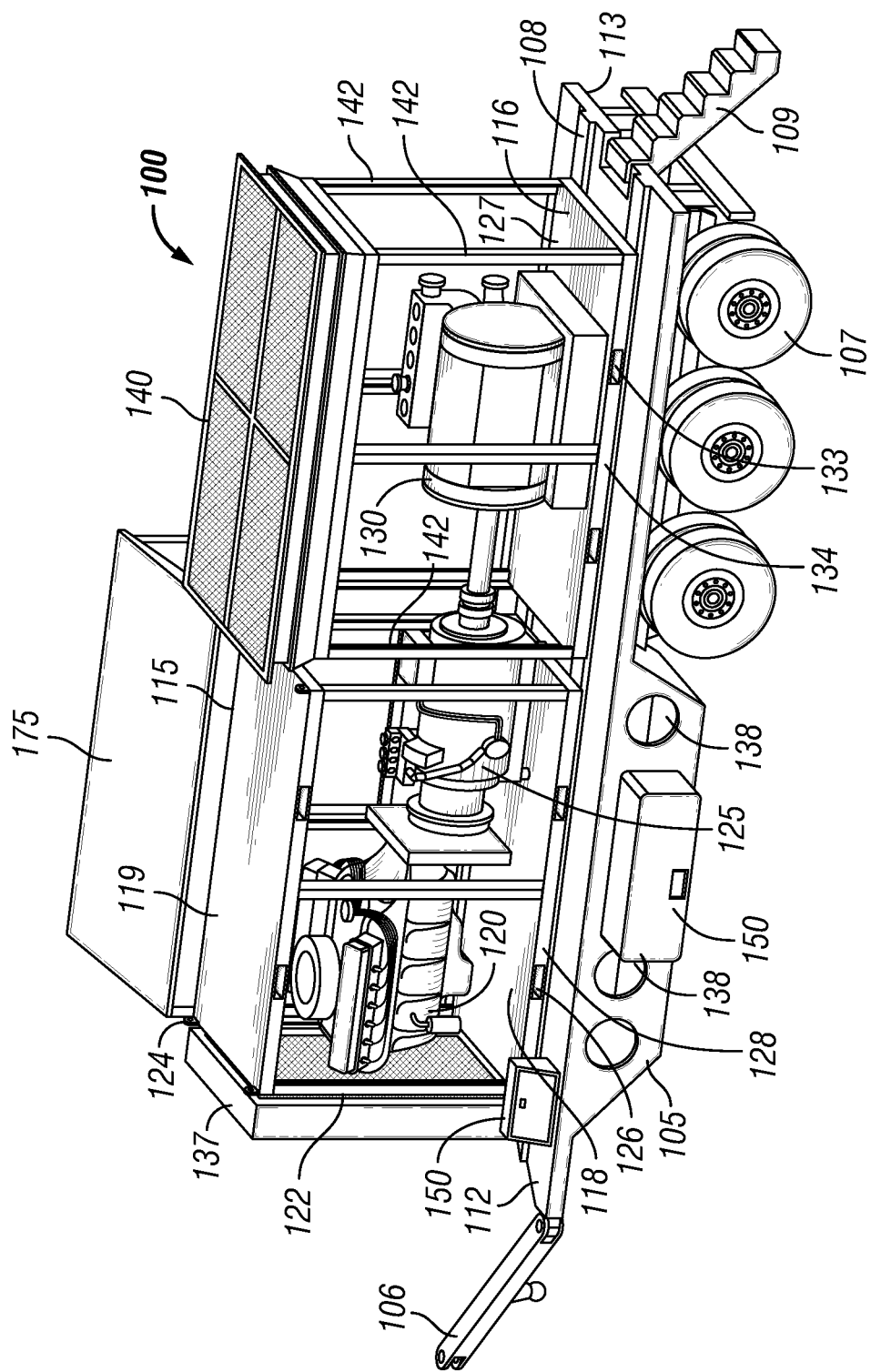
FIG. 6 is a perspective view of an embodiment of a mobile hydraulic fluid delivery system of the present application.

As shown in FIG. 6, one or more maintenance stations 150 may be located external the side of the chassis 105 and/or one or more maintenance stations 150 may also be located atop the support surface 112 as desired. One suitable external maintenance station 150 may include a box type member or similar enclosure configured as desired or as otherwise required. Another suitable external maintenance station 150 may include a configuration similar as commercially available toolbox type containers provided on trucks and the like.

Figure 7:
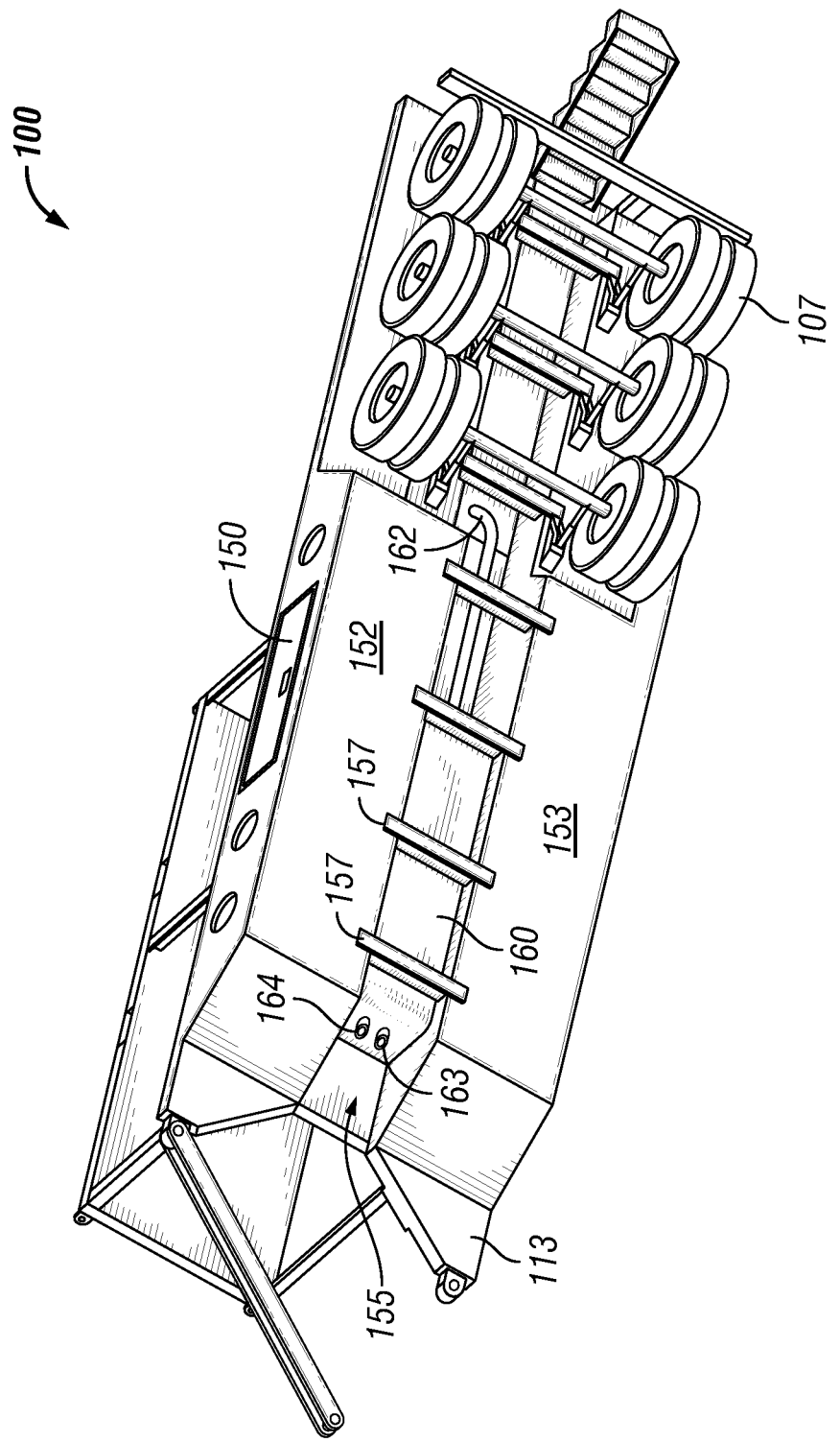
FIG. 7 is a perspective view of a second side of an embodiment of a chassis of the present application.

One exemplary second side 113 of a chassis 105 is depicted in the simplified illustration of FIG. 7. As shown, the rearward portion of the second side 113 includes the axles and tires 107 and the forward portion includes opposing first and second body members 152, 153 defining an opening or channel 155 there between. The opposing body members 152, 153 are operationally configured to provide spacing for one or more internally located maintenance stations 150 discussed above. As shown, the width of the chassis 105 may be defined by the width of the support surface 112. In another embodiment, the width of the chassis 105 may be defined by one or both of the opposing body members 152, 153 extending out from the remainder of the chassis 105 or an externally arranged maintenance station 150 as described above.

As opposed to commercially available units 5 as discussed above that are constructed to include fuel tanks 40 set along the sides of the chassis 10 fully exposed to contact that may otherwise damage, disfigure, or puncture one or more fuel tanks 40, the system 100 of this application includes one or more fuel tanks 160 disposed along the second side 113 of the chassis 105 within the channel 155 in a manner effective to protect the one or more fuel tanks 160 from the types of contact and damage that fuel tanks 40 of the prior art often encounter. The one or more fuel tanks 160 used herein are not necessarily limited to any particular configuration but suitably include a size and shape for use within the channel 155. One particular fuel tank design may include a cylinder design similar as the design of fuel tanks 40 of the prior art. In another embodiment, suitable fuel tanks 160 may include a size and shape corresponding to the size and shape of the channel 155. As understood by the skilled artisan, the one or more fuel tanks 160 are suitably constructed from one or more materials operationally configured for housing hydrocarbon-based fuels.

It is contemplated that in another embodiment one or more fuel tanks 160 may be secured to the second side 113 of the chassis 105 as desired, e.g., via fasteners, welds, and combinations thereof. One or more fuel tanks 160 may also be secured to one or both of the opposing body members 152, 153 via fasteners, welds, and combinations thereof. Other suitable shapes for the one or more fuel tanks 160 include, but are not necessarily limited to rectangular, oval, round, and irregular shapes operationally configured to conform to a particular chassis 105 configuration.

The chassis 105 may also include one or more channel supports 157 disposed across the channel 155 and secured to the opposing body members 152, 153 effective for assisting in maintaining the one or more fuel tanks 160 within the channel 155. Suitable channel supports 157 may be provided as railing or similar construction secured to the body members 152, 153 via fasteners such as bolts and the like. One or more channel supports 157 may also be permanently attached to the opposing body members 152, 153. In another embodiment, the bottom of the opposing body members 152, 153 may be closer together and/or include one or more inward extending lips or seats (or other ledge type members) obstructing part of the channel 155. A narrower channel 155 suitably acts as a support for the one or more fuel tanks 160 within the channel 155.

Figure 8:
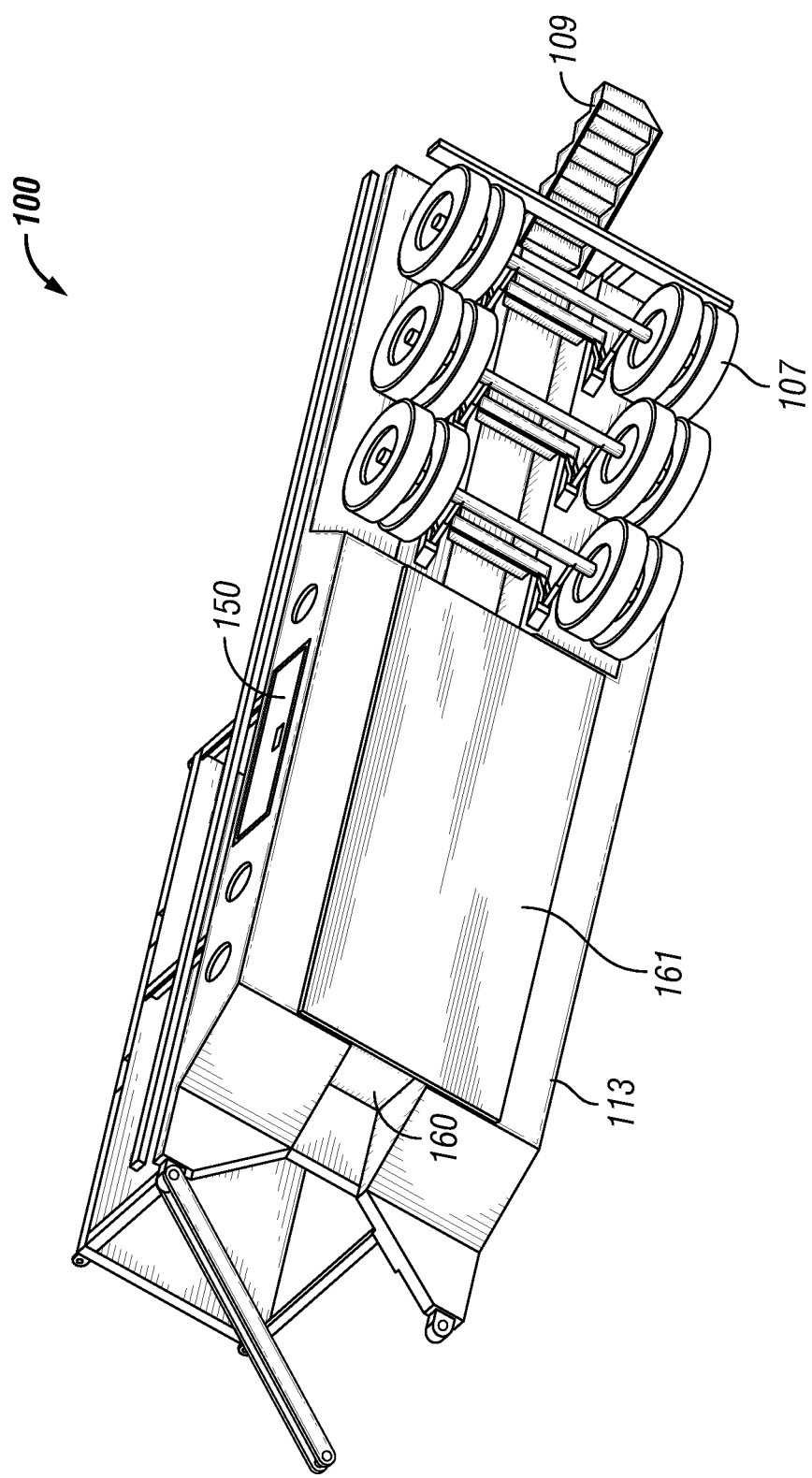
FIG. 8 is a perspective view of a second side of an embodiment of a chassis of the present application.

As opposed to partially exposed fuel tank(s) 160 as shown in FIG. 7, in another embodiment the second side 113 of a chassis 105 may include a removable cover 161 (or "cover plate") attachable to the opposing body members 152, 153 for concealing part of the one or more fuel tanks 160 housed within the channel 155 (see FIG. 8). One suitable removable cover 161 may be slidably communicated to the second side 113. Another cover 161 may be hingedly connected to the second side 113 for providing access to one or more fuel tanks 160. In still another embodiment, the cover 161 may be provided as a permanent fixed feature concealing the one or more fuel tanks 160. Similarly, the second side 113 may include a solid surface such as a body plate for concealing the one or more fuel tanks 160 housed within the channel 155.

Without limiting the invention, one suitable system 100 may employ two fuel tanks 160 housed within the channel 155. Each of the fuel tank 160 suitably includes a fuel fill spout type inlet 163, 164 located at the forward most part of the chassis 105 allowing for ease of access to each of the fuel tanks 160 for fueling purposes, thus, negating having to walk to the side of a chassis 105 to fill fuel tanks as is currently practiced in the prior art.

For typical hydraulic fracturing operations as contemplated herein, a suitable channel 155 of the system 100 of FIG. 7 may include dimensions as shown in Table 3.

TABLE 3

Length: from about 100.0 cm to about 500.0 cm (about 39.3 inches to about 196.85 inches)
Width: from about 30.0 cm to about 200.0 cm (about 11.81 inches to about 78.74 inches)
Depth: from about 10.0 cm to about 100.0 cm (about 3.93 inches to about 39.3 inches)

According to the dimensional information of Table 3, the total fuel capacity of the one or more corresponding fuel tanks 160 may range from about 50.0 liters to about 2500.0 liters (about 26.0 gallons to about 660.4 gallons).

Another advantageous feature of the present system 100 is use of the channel 155 as a location for the one or more fluid lines 162, e.g., the electrical, hydraulic and pneumatic lines of the system 100. In known commercial hydraulic frac pump operations, the fluid lines are typically constructed from flexible rubber, e.g., flexible rubber hose. Over time rubber hose often suffers from fatigue cracking, abrasion and/or cuts due to rubbing wear, bursting of hose under pressure, and/or damaged end fittings at hose connection points. As a result, typical fracturing operations include regular monitoring and replacement of the various fluid lines. By locating fluid lines 162 within the channel 155, the system 100 is operationally configured to minimize exposure and damage to any rubber hose or similar material employed. In another embodiment, all or a majority of the fluid lines 162 may be provided in the form of metal piping that is rated according to the pressure and flow requirement of the individual equipment of the system 100 thereby decreasing fluid line damage typical of rubber hose. In addition, metal piping may further include rubber or plastic hose at the terminal ends of individual lines for vibration dampering.

Figure 9:
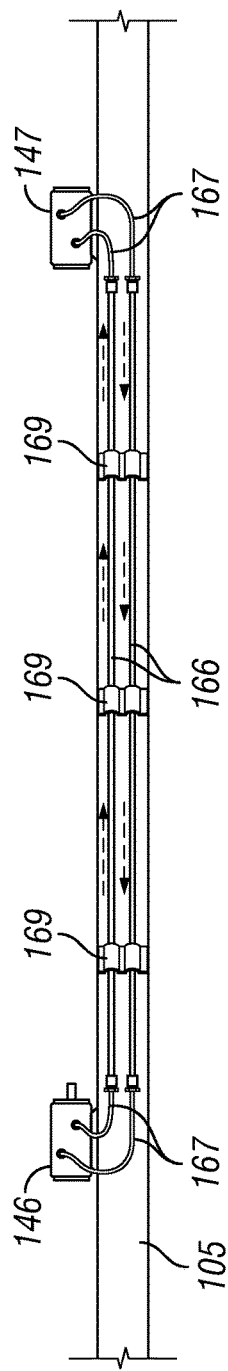
FIG. 9 is a simplified illustration of a fluid line configuration of the mobile hydraulic fluid delivery system.

In one embodiment, each of the fluid lines 162 of the system 100 may include a primary section 166 constructed from stainless steel pipe and end sections 167 constructed from rubber hose material or the like. With attention to the simplified illustration of FIG. 9, a feed line and return line for a hydraulic pump 146 and hydraulic motor 147 are depicted, each of the feed and return fluid lines 162 are suitably constructed from stainless steel and are held in a fixed position via one or more pipe clamps 169 located along the chassis 105. In this example, each of the fluid lines 162 suitably terminates in end sections 167 such as rubber hydraulic jumper hose effective to fluidly communicate the fluid lines 162 with the hydraulic pump 146 and hydraulic motor 147. In one embodiment, the end sections 167 may be provided in uniform lengths, ratings and sizes for ease of storage and use of replacement end sections 167. The pipe clamps 169 employed may include those clamps and/or pipe brackets known in the art for securing metal piping. Also, other types of metal may be employed other than stainless steel.

For hydraulic fracturing operations, various fluid lines 162 contemplated for use include, but are not necessarily limited to: (1) an engine cooling line for removing heat from the engine 120 via the radiator 140, (2) a radiator cooling fan hydraulic line providing power from the engine 120 to rotate radiator 140 fan blades for aiding in cooling the engine 120, (3) an engine oil lubrication line for circulating engine oil through oil filters and removing particles that may otherwise damage the internal workings of the engine 120, (4) a transmission oil lubrication line for circulating transmission oil through oil filters and removing particles that may otherwise damage the internal workings of the engine 120, (5) a transmission oil cooling line for circulating transmission oil through coolers, e.g., coolers mounted on the underside of the radiator 140, for removing heat from the transmission 125, (6) a power end lubricating oil line effective for using engine 120 power to circulate gear oil through a filtration system to remove particles to maximize lubrication of the rotating parts with the power end, (7) one or more pneumatic lines that may serve various functions including, but not necessarily limited to operating pneumatic valves, forming an integral part of standard engine 120 and/or transmission 125 and/or high pressure pump 130 operation, and providing air for an oil pump lubricating system.

Figure 10:
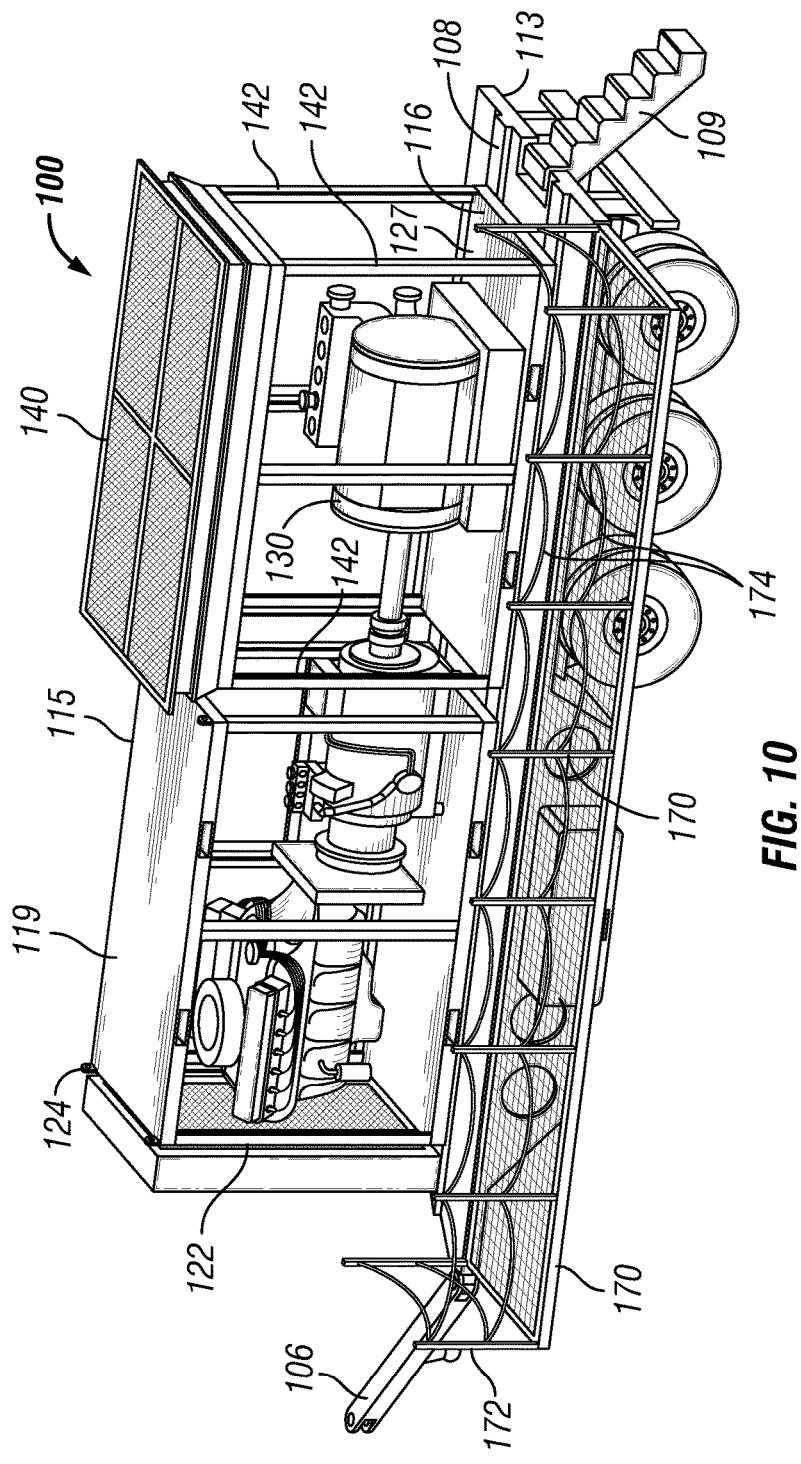
FIG. 10 is a perspective view of an embodiment of a mobile hydraulic fluid delivery system including an embodiment of a work platform set to an operable position.

With reference to FIG. 10, the system 100 may also include one or more fold down work platforms 170 disposed along the one or both sides of the chassis 105. A suitable work platform 170 may include those commonly known in the art under names such as "industrial catwalk" and "elevated walkway" including, but not necessarily limited to those including slip resistant bar grating materials, solid surfaces, perforated material, and combinations thereof. Suitable bar grating includes, but is not necessarily limited to expanded grating, serrated diamond matrix, perforated buttons, and the like constructed from steel, aluminum, one or more polymeric materials, one or more composite materials, and combinations thereof. Suitable solid surfaces include, but are not necessarily limited to diamond plate material constructed from steel, aluminum, and combinations thereof. A suitable work platform 170 may also include vertical supports or posts 172 and/or guard rails and/or hand rails (hereafter "railing 174") or the like as desired or otherwise required. Vertical posts 172 and railing 174 may be constructed from one or more metals, polymeric materials, composite materials, woods, and combinations thereof. One suitable type of railing 174 may include tubular and/or rectangular members attached between adjacent posts 172. Another suitable type of railing 174 may include elongated members disposed along the distance of the railing 174 or at least a portion of the railing 174. Suitable elongated members include, but are not necessarily limited to chain link, rope, cable, and combinations thereof. Cable may include steel cable, plastic cable, and combinations thereof. Vertical posts 172 may be fastened to the work platform 170. In another embodiment, the work platform 170 may include a plurality of female type members for receiving vertical posts therein in a manner effective for maintaining the vertical posts in an upright position as shown in FIG. 10.

Figure 11:
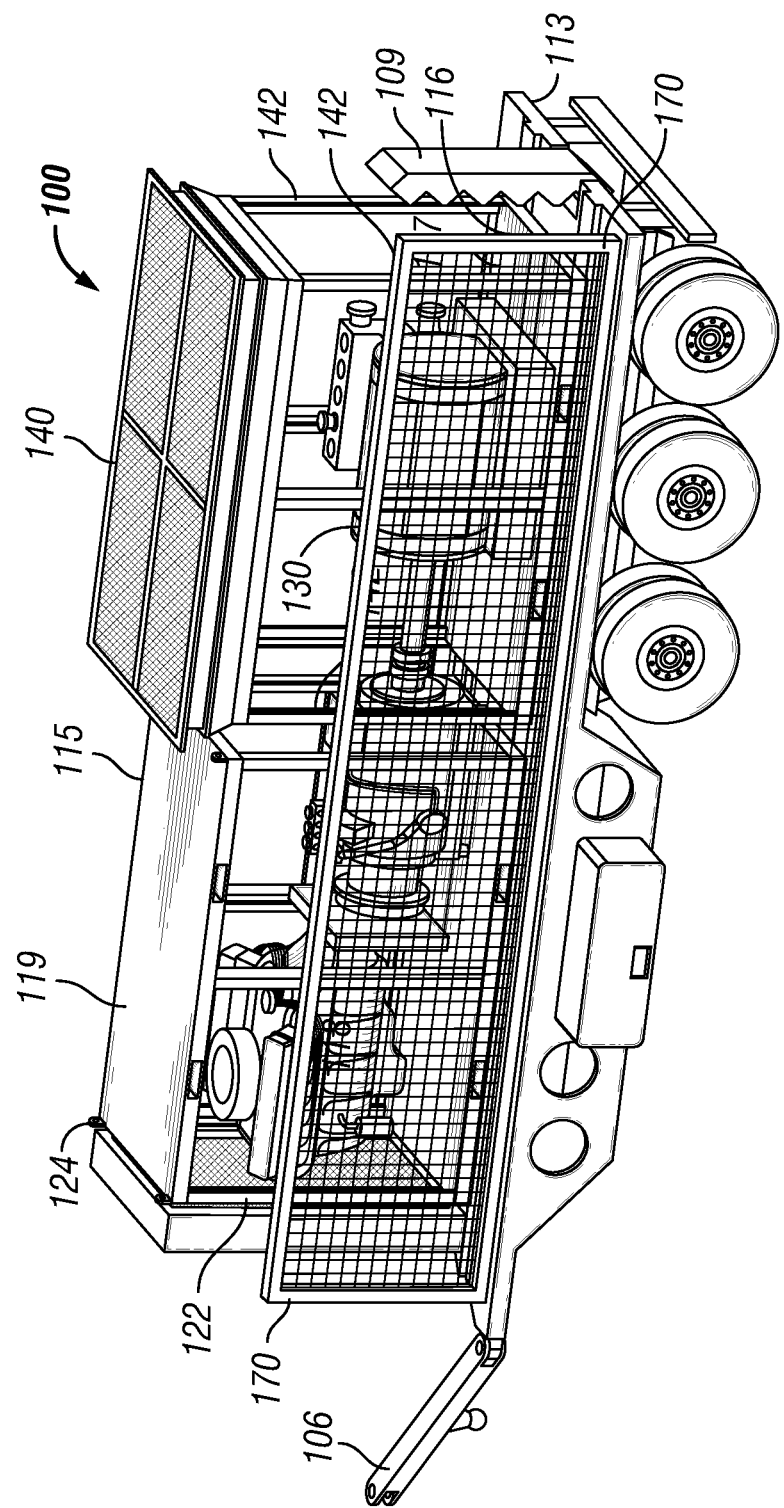
FIG. 11 is an embodiment of a mobile hydraulic fluid delivery system illustrating a simplified work platform set at an upright non-operable position.

Without limiting the invention, one suitable work platform 170 may be directed upward from the operable position of FIG. 10 and secured via one or more clamps, rope, removable pins, chain, brackets, latches, and combinations thereof in an upright non-operable position as shown in the simplified illustration of FIG. 11. In another embodiment, a work platform 170 may be directed downward and secured via one or more clamps, rope, removable pins, chain, brackets, latches, and combinations thereof. A suitable fold up or fold down work platform 170 may be hingedly attached to the support surface 112 of the chassis 105 via one or more fastening hinges. Another suitable fold down work platform 170 may include one or more tubular members disposed within corresponding tubular member(s) located along the support surface 112 and turnable therein. In another embodiment, a work platform 170 may be provided as a removable member for attaching to a chassis 105 for use and removed for storage. For fracturing operations, a suitable platform as shown in FIG. 10 may be located about 1.2 meters (about 3.93 feet) above the ground or floor and hold up to about 500.0 kg (about 1102.31 pounds), which is roughly about the weight of four adult persons at any given point in time.

Turning again to FIG. 6, the system 100 may also include one or more awnings 175, sun shields or the like for providing shade or cover to individuals working around the system 100. In one embodiment, one or more retractable awnings 175 or the like may be employed. In another embodiment, one or more fixed awnings 175 or the like may be employed. Likewise, a combination of retractable and fixed awnings 175 or the like may be used in combination. In one embodiment an awning 175 is of similar design and construction as awnings used for buildings and other structures. For example, an awning 175 of this application may include a perimeter support frame and make use of mounting brackets for fastening the awning 175 directly to the outer surface of the first and/or second sub-assemblies 115, 116. In another embodiment, an awning 175 may be releasably secured directly to a radiator 140 via a latch assembly whereby one part of the latch assembly is secured to the outer edge of the radiator 140 via welds, bolt type fasteners, rivets, and combinations thereof, and another part of the assembly is permanently affixed to an awning bracket.

One suitable awning 175 for hydraulic fracturing operations may be constructed from one or more textiles and have a length from about 100.0 cm to about 300.0 cm (about 39.37 inches to about 118.1 inches) and a width from about 100.0 cm to about 600.0 cm (about 39.37 inches to about 236.2 inches). Suitable textiles include, but are not necessarily limited to fabrics known to persons of ordinary skill in the art of awning materials. Exemplary fabrics include, but are not necessarily limited to polyester, cotton, linen, hemp, nylon, rayon, vinyl, and combinations thereof. Moreover, suitable fabrics may include woven fabric and/or knitted fabric. One particular fabric employed may include a vinyl encapsulated polyester material. Another particular fabric employed may include a vinyl polyester composite material. Another particular fabric employed may include canvas. Suitable textiles may also include water-repellant properties. Likewise, textiles may also include one or more fire-retardant properties. Suitable textiles may also be infused with antimicrobial agent(s) to protect against bacteria, fungi, and mildews. Suitable textiles may also be provided resistant to ultra-violet radiation. Textiles employed may include one or more colors and patterns as desired or as otherwise required.

Figure 12:
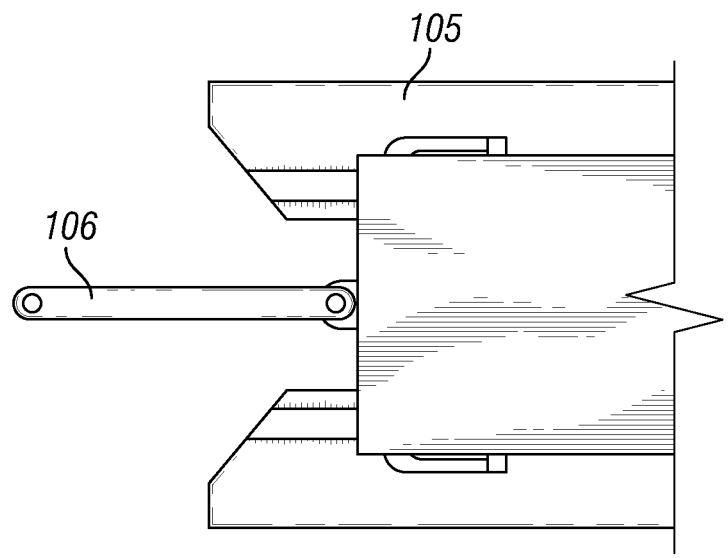
FIG. 12 is a simplified top view of an embodiment of a chassis of the present application including an embodiment of a tow connection pivotally attached to the chassis.
Figure 13:
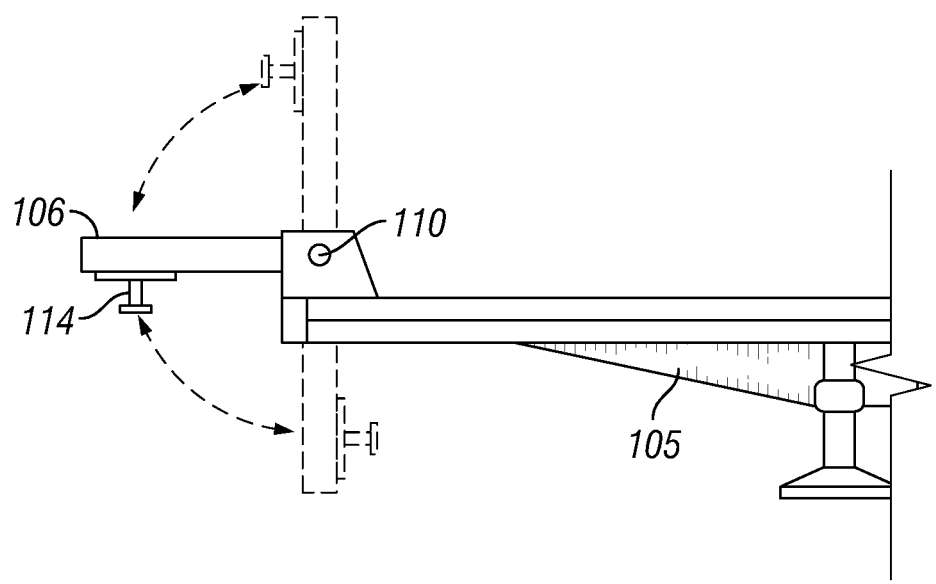
FIG. 13 is another simplified side view of an embodiment of a chassis of the present application including an embodiment of a tow connection pivotally attached to the chassis.

In the embodiments discussed above, the tow connection 106 is shown hingedly attached to a forward side edge section of the chassis 105. In another embodiment, a tow connection 106 may be hingedly connected to the chassis 105 at or near the midpoint of the forward side of the chassis 105 as shown in FIG. 12. The pivotability of the tow connection 106 about the chassis 105 may be limited according to chassis 105 construction as shown in FIG. 12. In an embodiment of the tow connection 106 as shown in FIG. 3, the tow connection 106 may pivot up to about 180.0 degrees or more. With reference to FIG. 13, the pivot point 110 of the tow connection 106 may be operationally configured to allow the tow connection 106 to pivot along a vertical plane about 180.0 degrees or more in addition pivoting along a horizontal plane. A suitable pivot point 110 may include, but is not necessarily limited to a ball and hinge type assembly, a pivot coupler, and a ball and seat type assembly. In one particular embodiment, a twin pin setup may be used in which two hinge pins suitably affix the tow connection 106 to the pivot point 110. In this embodiment, if a left hand pin is removed, the tow connection 106 may swing directionally to the right. Likewise, if a right hand pin is removed, the tow connection 106 may swing directionally to the left. As shown in FIG. 13, the tow connection 106 may also include a coupling 114, e.g., a king pin lock, for releasably attaching the chassis 105 to a truck 7 or other vehicle.

Another embodiment of the system 100 is provided in FIGS. 14-22. Similar as described above, the system 100 of this embodiment includes a chassis 205 (shown here as a tri axle chassis) that operates as a first support member of the system 100, a first sub-assembly 215 operating as a second support member and a second sub-assembly 216 operating as a third support member. The chassis 205 may also be similarly equipped with a stairway 209 at the rear of the chassis 205 as shown.

Figure 14:
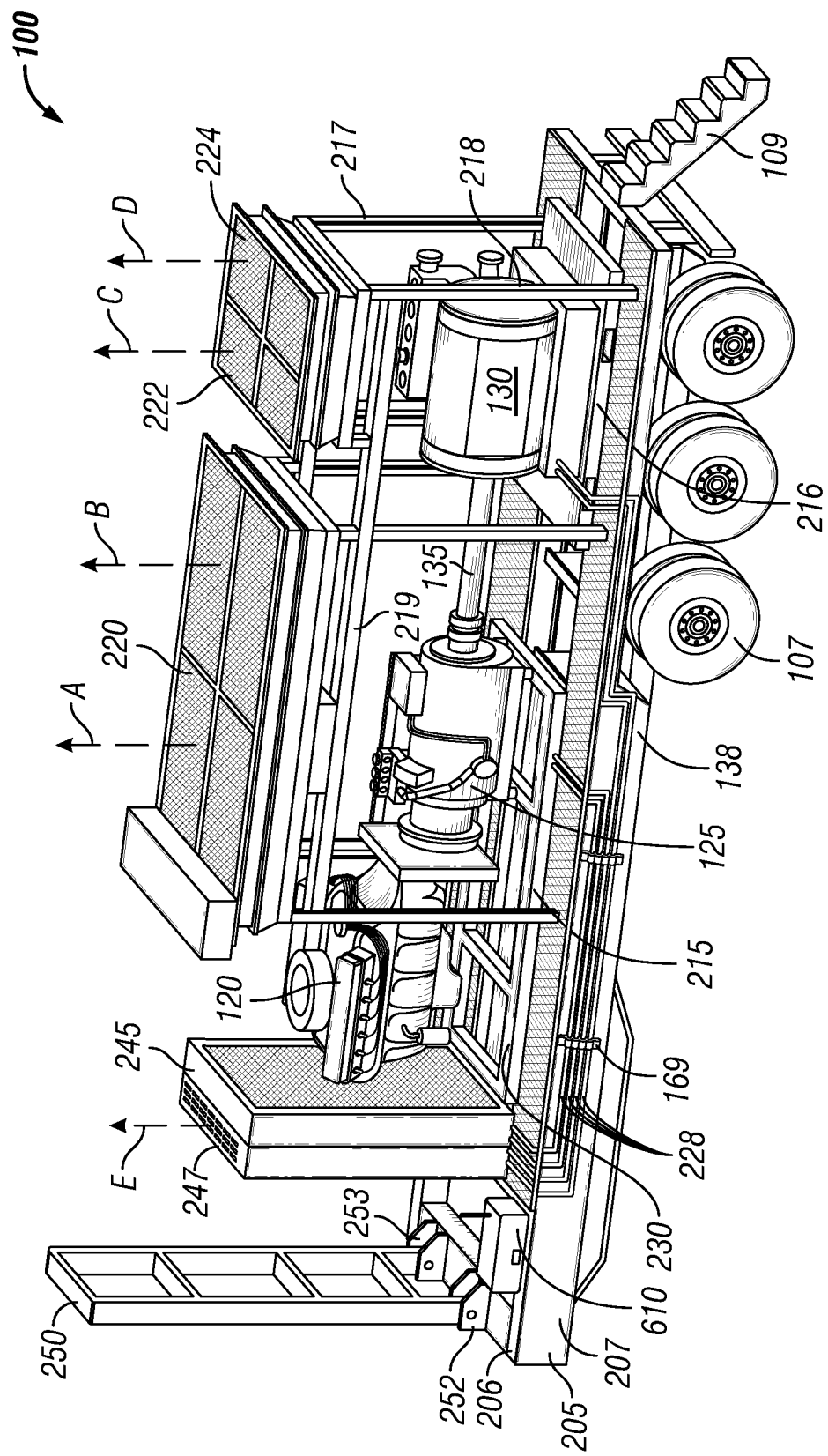
FIG. 14 is a side perspective view of another embodiment of a mobile hydraulic fluid delivery system.

The system 100 of this embodiment further includes a third sub-assembly 217 disposed above the second sub-assembly 216 and disposed above part of the first sub-assembly 215 at a desired elevation as seen in FIG. 14. The third sub-assembly 217 suitably includes one or more vertical support members 218 and one or more horizontal support members 219 operationally configured to support at least part of the cooling system of the system 100, namely, a jacket water cooler 220 for the engine 120, a hydraulic oil cooler 222 and a transmission radiator 224 apart from the upper surface 206 of the chassis 205-Arrows A-D representing directional air flow out from air vents of each. Herein, the one or more vertical support members 218 and one or more horizontal support members 219 may be collectively referred to as the "support frame" of the third sub-assembly 217. The third sub-assembly 217 may be referred to herein as the "cooling sub-assembly."

The various components of the cooling system 220, 222 and 224 are fluidly communicated with the engine 120, transmission 125 and high pressure pump 130 via suitable conduit as known in the relevant art. As seen in FIG. 14, the all fluid conduit and electrical lines (collectively "lines 228") are disposed along a sidewall 207 of the chassis 205 and secured to the chassis 205 via one or more pipe clamps 169 as described above. In one particularly advantageous embodiment, the hydraulic line(s) of the system 100 of FIG. 14 suitably include hydraulic fan drive lines, engine hydraulic oil lines, transmission oil lines, engine oil lines to and from an engine oil filter, transmission oil lines to and from a transmission oil filter, pump oil lubricating lines; the pneumatic line(s) suitably include air actuated lines for various valves of the system, air lines to an over speed protection device or over speed trip fitted to the engine 120, air lines for brakes, air lines for an auto tire inflation system; and the electrical lines include 12V, 24V electrical lines, lighting supply lines, trailer or chassis 205 lighting lines.

The one or more vertical support members 218 are suitably secured directly to the upper surface 206 of the chassis 205 as desired, including, but not necessarily limited to the modes of attachment as described above in regard to attachment of the one or more second support members 142 with the support surface 112. As understood by skilled artisan, the jacket water cooler 220 operates as a closed circuit cooling water supply to the engine 120 for controlling the temperature of the engine 120 by cooling water received from the engine 120 and circulating cooled water back to the engine 120. A suitable jacket water cooler 220 may include a commercial model as currently available from Houston Global Heat Transfer, L.L.C., Humble, Tex., U.S.A. A typical jacket water cooler includes an outer housing, a jacket water transfer pump, radiator, fan, fan belt, thermostat, radiator expansion tank, and jacket water temperature sensor. Suitable fluid lines for circulation of water between the jacket water cooler 220 and engine 120 include pipework made of either stainless steel pipe or mild steel schedule 40 pipe or mild steel schedule 80 pipe, hydraulic hoses rated for appropriate coolant operating temperatures and pressures, and combinations thereof. Suitable fluid lines may be included with lines 228 discussed above or run along the chassis 205 at one or more different locations. In another embodiment, the jacket water cooler 220 may be provided as an open circuit system if required. A suitable hydraulic oil cooler 222 for use herein is commercially available from Hydraquip, Inc., Houston, Tex., U.S.A. Likewise, a suitable transmission radiator 224 is commercially available from Houston Global Heat Transfer, L.L.C., Humble, Tex., U.S.A.

The jacket water cooler 220, hydraulic oil cooler 222 and transmission radiator 224 are suitably independently releasably secured to the support frame via bolt type fasteners and brackets. Unlike the high ambient radiator 20 of the prior art with radiators in a stacked assembly, the jacket water cooler 220, hydraulic oil cooler 222 and transmission radiator 224 may be treated separately making each easier to clean, repair and otherwise maintain. In one particular releasable embodiment, the jacket water cooler 220, hydraulic oil cooler 222 and transmission radiator 224 may be fitted with female type members for receiving the male type upper ends of vertical support members 218 therein allowing the jacket water cooler 220, hydraulic oil cooler 222 and transmission radiator 224 to sit thereon. Release pins and the like may be employed for securing the jacket water cooler 220, hydraulic oil cooler 222 and transmission radiator 224 to the vertical support members 218. Accordingly, one or more of the jacket water cooler 220, hydraulic oil cooler 222 and transmission radiator 224 may be removed from the third sub-assembly 217 for replacement or repair without having to remove the remaining third sub-assembly 217 from the chassis 205. However, in another embodiment, the complete third sub-assembly 217 may be removed from the chassis 205 and replaced with a different third sub-assembly as desired. For example, the support frame may include one or more lift eyes similar as described in reference to FIG. 3 for transport of an intact third sub-assembly 217. In another embodiment, welds may be employed for purposes of permanently securing one or more of the jacket water cooler 220, hydraulic oil cooler 222 and transmission radiator 224 to the support frame. Moreover, one or more of the jacket water cooler 220, hydraulic oil cooler 222 and transmission radiator 224 may provide an attachment surface for one or more awnings 175 as described above.

In this embodiment of the system 100, the first sub-assembly 215 includes a base frame 230 operationally configured to support an engine 120 and transmission 125 thereon. Suitably, the frame platform 230 is secured to the chassis 205 via fasteners such as nut/bolt fasteners and/or other threaded fasteners. Likewise, the base frame 230 suitably includes mounting surfaces (or "mounts") for supporting the engine 120 and transmission 125, whereby the engine 120 and transmission 125 are suitably secured to the mounts via fasteners such as nut/bolt type fasteners and/or other threaded fasteners. One suitable base frame 230 may be similar in design as a skiddable base frame provided with known generator sets, including, but not necessarily limited to the Caterpillar® C7.1 Generator Set commercially available from Caterpillar, Inc., Peoria, Ill., U.S.A.

In one particular embodiment, the base frame 230 may be provided with a plurality of mounting surfaces and/or fastener through holes operationally configured for use with multiple sizes, types and/or brands of engines 120 and transmissions 125. Such versatility in design provides users of the system 100 with the convenience of not necessarily having to replace the engine 120 and/or transmission 125 with the same make or model engine and/or transmission. For example, the base frame 230 may be operationally configured for use with various engines 120, including for example, the Caterpillar® 3512 engine commercially available from Caterpillar, Inc., Peoria, Ill., U.S.A; the Cummins QSK50 engine commercially available from Cummins, Inc., Columbus, Ind., U.S.A; and the MTU Series 4000 engine commercially available from Rolls-Royce Power Systems AG, Friedrichshafen, Germany. Likewise, the base frame 230 may be operationally configured for use with various transmissions 125, including for example, the Caterpillar® TH55-E70 and TH55-E90 oilfield transmissions commercially available from Caterpillar, Inc., Peoria, Ill., U.S.A; and the Allison Transmission 9800 Oil Field Series commercially available from Allison Transmission, Inc., Indianapolis, Ind., U.S.A.

Figure 17:
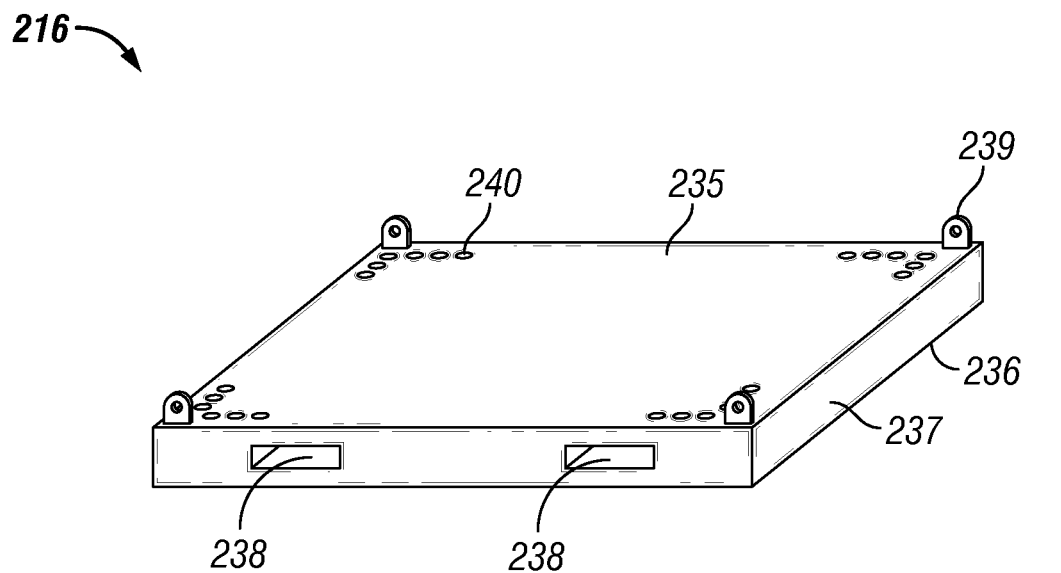
FIG. 17 is a perspective view of an embodiment of a second sub-assembly for use with the system of FIG. 14.
Figure 23:
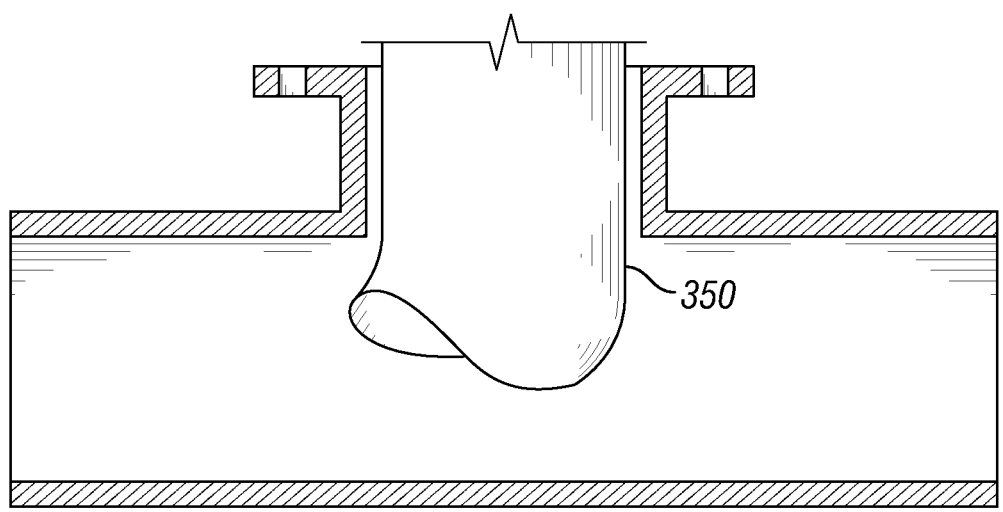
FIG. 23 is an exemplary illustration of a wear plate for use within fluid conduits of a mobile hydraulic fluid delivery system of the present application.

In this embodiment, the second sub-assembly 216 includes a skid type support platform operationally configured to support a corresponding high pressure pump 130 or high pressure pump assembly thereon. In another embodiment, the second sub-assembly 216 may be operationally configured to support two or more high pressure pumps 130 thereon. One suitable second sub-assembly 216 for use herein is depicted in FIG. 17. In this embodiment, the second sub-assembly 216 includes a rectangular member having a first support surface 235, an opposing second surface 236 and sidewalls 237. As shown, the sidewalls 237 may include a pair of forklift pockets 238 similar as described above. In addition, the first support surface 235 may include one or more lift eyes 239 for transport of the second sub-assembly 216. In this embodiment, each of the four corners of the first support surface 235 is provided with a lift eye 239 for ease of transport. As further seen in FIG. 17, the first support surface 235 also includes an array of fastener holes 240 disposed along the first support surface 235—shown in this embodiment as being located at or near each corner first support surface 235. In one embodiment, the fastener holes 240 may be provided as threaded bolt holes. The array of fastener holes 240 are operationally configured for use with multiple sizes, types and/or brands of high pressure pumps 130. Similar as stated above, such versatility in design provides users of the system 100 with the convenience of not necessarily having to replace a high pressure pump 130 with the same make or model pump. Also, the array of fastener holes 240 means that new holes do not have to be formed directly in the chassis 205 to accommodate fastening of a new type of high pressure pump 130 as is common practice in the prior art using a chassis 10 as shown in FIGS. 1 and 2. Suitable high pressure pumps 130 include Triplex and Quintuplex pumps known in the art. As such, the array of fastener holes 240 allows for interchangeability between Triplex and Quintuplex pumps. Exemplary commercial sources of Triplex and Quintuplex pumps include Gardner Denver, Inc., Milwaukee, Wis., U.S.A; and Weir Group PLC, headquartered in Glasgow, Scotland. In addition, a high pressure pump 130 may be fitted with a wear plate 350 inside the suction manifold of the high pressure pump 130 similar as shown in the illustration of FIG. 23.

With further reference to FIG. 14, the system 100 also includes an air cooler 245 with a mechanically driven fan set adjacent the engine 120 chassis 205 for cooling the engine 120. A suitable air cooler 245 includes an engine radiator with a fan and water tank. To keep air from blowing toward the front of the chassis 205 one or more air deflectors may be located adjacent the air cooler 245 between the air cooler 245 and the front of the chassis 205. One suitable air deflector includes a plenum box 247 in fluid communication with the air cooler 245 operationally configured to divert the flow of air from the air cooler 245 upward out through one or more vents of the plenum box 247 according to directional Arrow E. A suitable air deflector such as a plenum box 247 is also operationally configured block air flow to the air cooler 245 when the chassis 205 is in transport. Blockage of air flow to the air cooler 245 helps to prevent fatigue of the blades of the fan of the air cooler and guards against debris and insects from getting caught in the air cooler 245.

Figure 19:
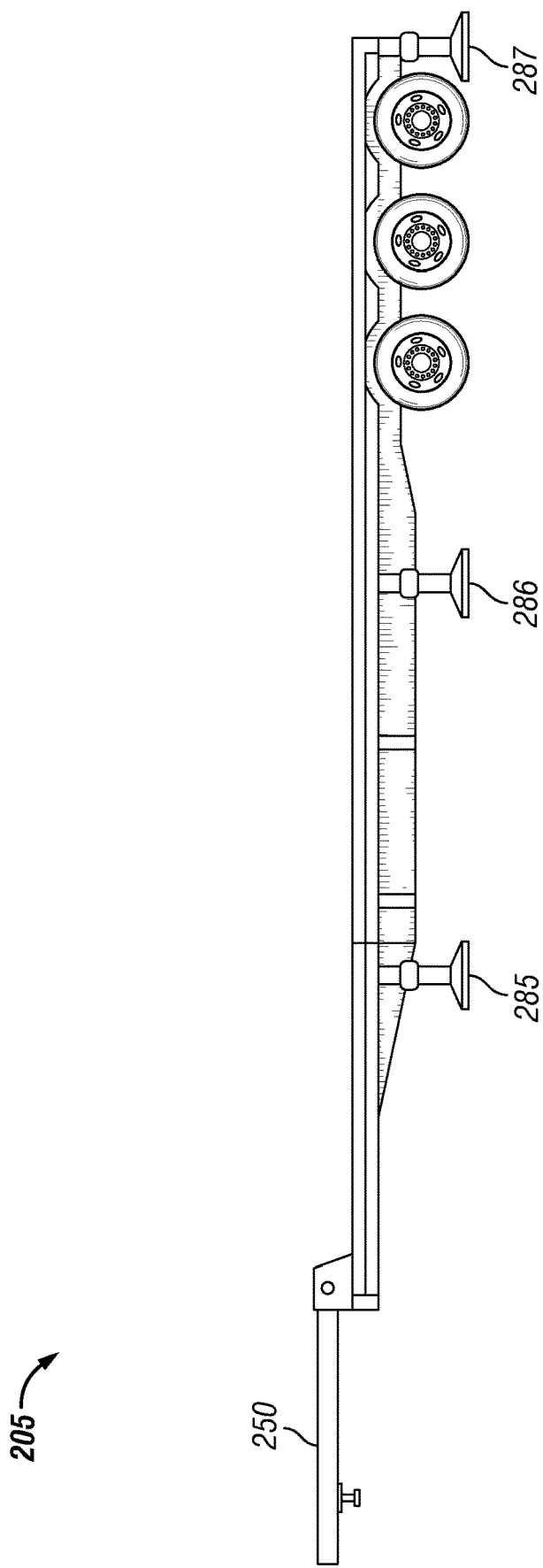
FIG. 19 is a side view of an exemplary chassis of this application.

The front of the chassis 205 is defined by a pivoting tow connection (hereafter "pivoting beam 250") operationally configured to be directed from a non-operating upright or vertical position as seen in FIG. 14 to an operating non-vertical position or horizontal position as seen in FIG. 19. In one embodiment, the pivoting beam 250 may be hingedly secured to the chassis 205. In another embodiment, the pivoting beam 250 may be removed from the chassis 205 and set at either the non-operating vertical position or the operating horizontal position. As shown, one suitable pivoting beam 250 may include a ladder type configuration with opposing side rails and cross rails for structural support. In one particularly advantageous embodiment as shown in FIG. 14, the chassis 205 may include opposing pivoting beam supports 252, 253 with raised side walls effective for receiving part of each side rail therein. Suitably, the pivoting beam supports 252, 253 and the side rails include corresponding apertures for receiving a pivot rod there through effective for the pivoting beam 250 to be directed back and forth between a vertical position and a horizontal position. Suitably, locking pins or the like may be employed for maintaining the pivoting beam 250 in a vertical or non-vertical position. In one example, the side rails and beam supports 252, 253 may include corresponding apertures for receiving one or more locking pins there through.

Figure 16:
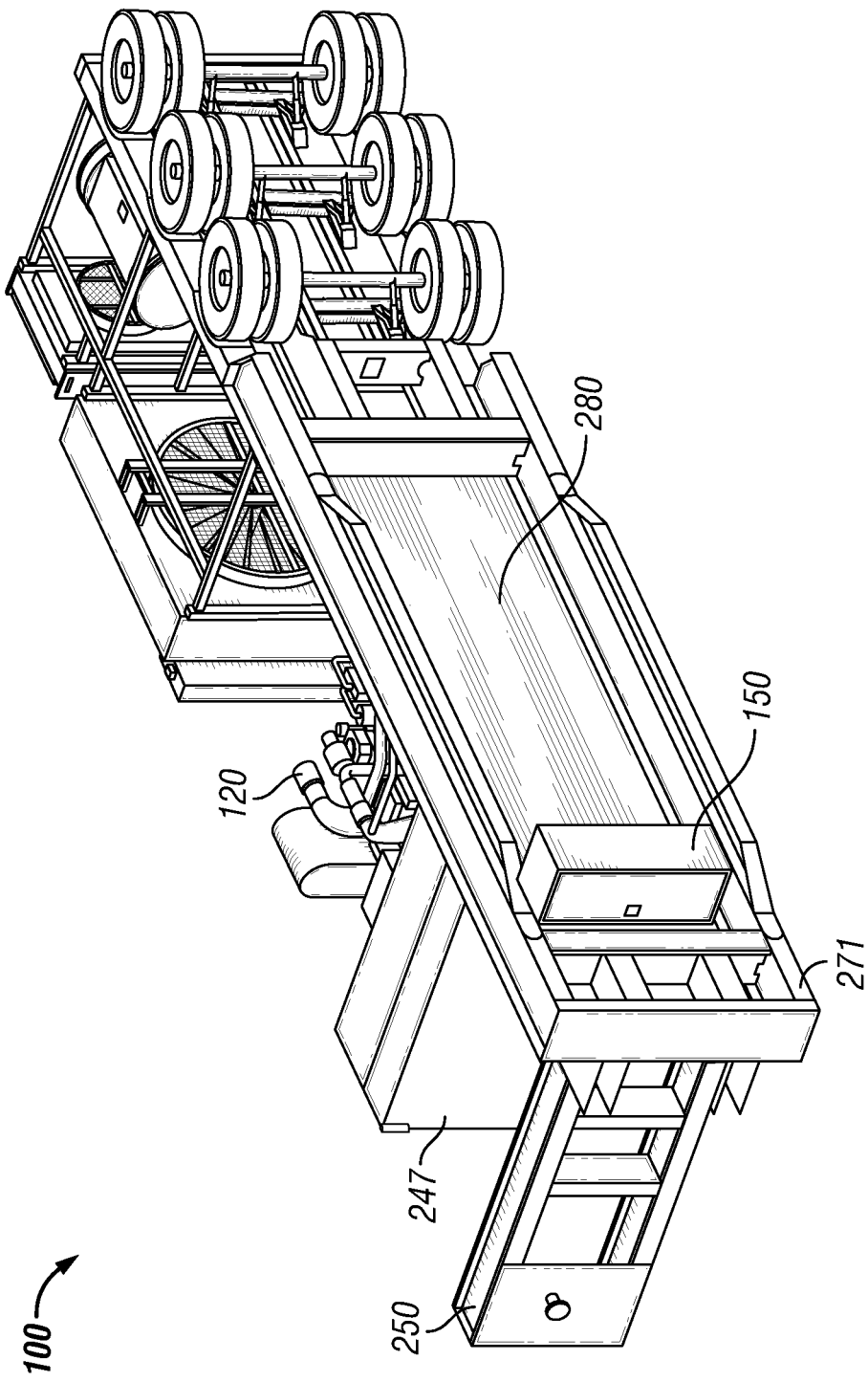
FIG. 16 is a perspective view of a mobile hydraulic fluid delivery system including a second side of a chassis.
Figure 21:
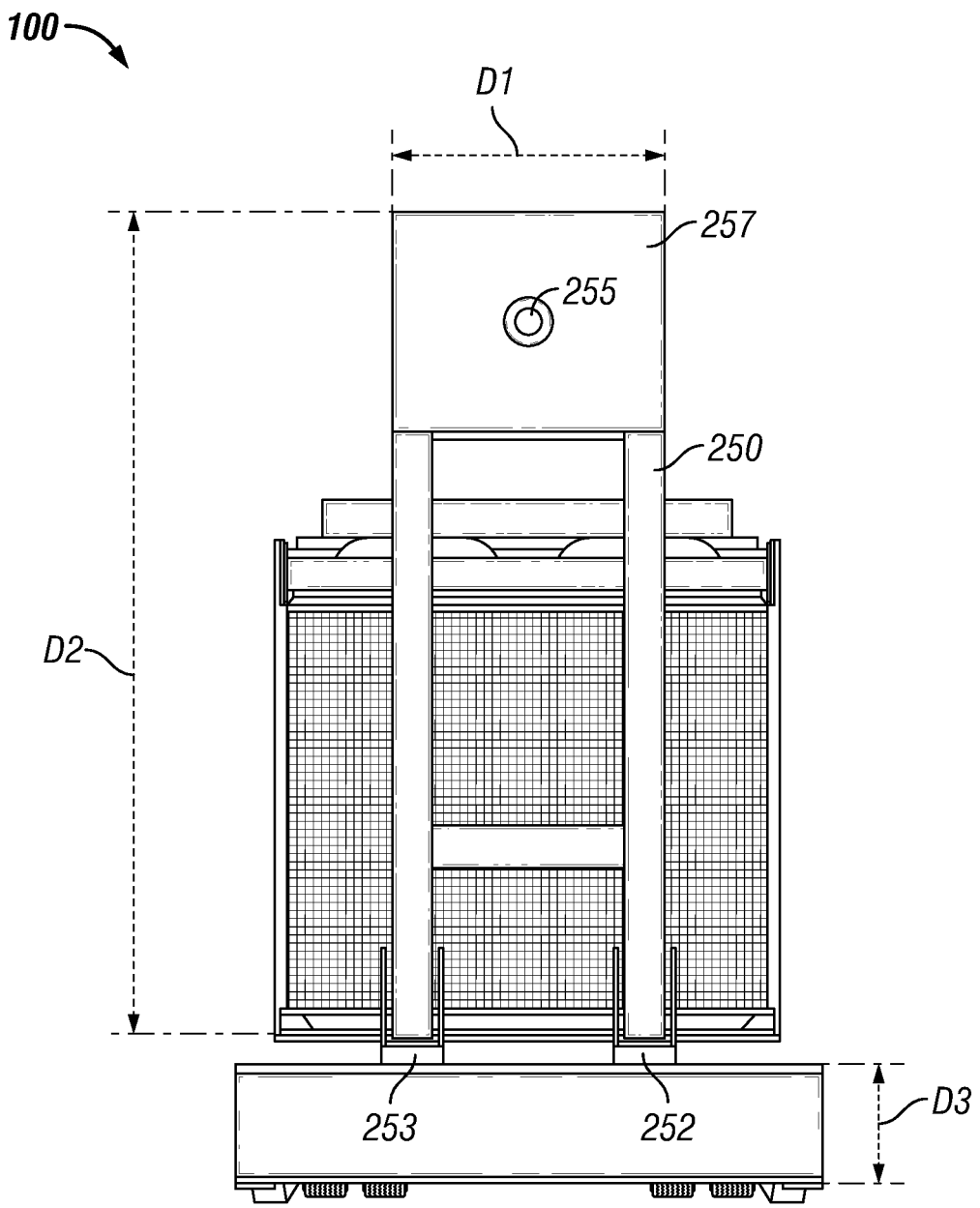
FIG. 21 is a front view of a mobile hydraulic fluid delivery system of the application.

Looking at FIGS. 16 and 21, the pivoting beam 250 suitable includes a king pin lock 255 operationally configured to releasably attach the chassis 205 to a truck 7 or other vehicle. In this embodiment, the distal end of the pivoting beam includes a structural support member 257 for the king pin lock 255. For purposes of durability, a suitable king pin lock 255 of this application is constructed from one or more metals including carbon steel, stainless steel, titanium, aluminum, and combinations thereof. In one embodiment, the structural support member 257 may include a steel plate or the like secured to the side rails and/or cross rails of the pivoting beam 250. For example, where the pivoting beam 250 is constructed from one or more metals, the structural support member 257 may be welded to the side rails and/or cross rails. As explained below, a suitable pivoting beam 250 is constructed from one or more metals providing a pivoting beam 250 a desired weight. Suitable pivoting beam 250 materials of construction include, but are not necessarily limited to carbon steel, stainless steel, titanium, aluminum, lead, and combinations thereof. It is further contemplated that where additional weight is required for a particular pivoting beam 250, the pivoting beam 250 may be fitted with removal weighted members such as lead weights and the like. In one suitable embodiment, the pivoting beam 250 may account for about ten percent (10.0%) to about twenty-five percent (25.0%) of the total weight of the system 100. Although the system 100 may be built to scale, a system 100 as shown in FIG. 14 may include a total weight of about 46,266.0 kg (about 102,000.0 pounds).

In one aspect, the pivoting beam 250 of this application is advantageous in that it may be raised to a vertical position effectively shortening the length of the system 100 during operation of the system 100. Without restraining the invention to any particular dimensional limitations, a pivoting beam 250 set at a non-vertical position suitably increases the total length of the system 100 by about 10.0 percent to about 35.0 percent. The pivoting beam 250 of FIG. 14 is operationally configured to increase the overall length of the system 100 by about 22.0 percent. As understood by persons of ordinary skill in the art, the total length of the system of FIG. 14 may change depending on the point of attachment of the pivoting beam 250 to the chassis 205.

In another aspect, when set to a non-vertical position the pivoting beam 250 includes a length and/or weight effective to promote weight distribution of the system 100, i.e., move the center of gravity of the system 100, as desired. In other words, when the pivoting beam 250 of FIG. 14 is set to a non-vertical position the center of gravity of the system 100 suitably moves toward the front of the system 100, i.e., toward the pivoting beam 250.

In an embodiment where the system 100 may be determined to be noncompliant according to the United States Department of Transportation Federal Bridge Gross Weight Formula at the time of this application with the pivoting beam 250 set at a vertical position, by directing the pivoting beam 250 to a non-vertical position as shown in FIG. 19 the pivoting beam 250 suitably has a length and/or weight effective to distribute the weight of the system 100 into compliance with the United States Department of Transportation Federal Bridge Gross Weight Formula. As will be appreciated by the skilled artisan, the pivoting beam 250 may be configured to meet similar weight distribution standards of other Governmental bodies and/or territories. Moreover, when the pivoting beam 250 is set at a vertical position as shown in FIG. 14, each of the three axles of the system 100 realizes a first axle weight. When the pivoting beam 250 is set at a non-vertical position, as seen in FIG. 19, each of the three axles realizes a second axle weight less than the first axle weight.

For example, a pivoting beam 250 having a first length/weight may be removed from a chassis 205 and replaced with a different pivoting beam 250 having a second length/weight in the event a system 100 is to be transported to a country or region requiring a different weight distribution. As understood by the skilled artisan, by changing the length and/or weight of the pivoting beam 250 the tongue weight may be changed. A suitable tongue weight of the system 100 as shown in FIG. 14 may range from about 9.0 percent to about 15.0 percent the total weight of the system 100.

Figure 15:
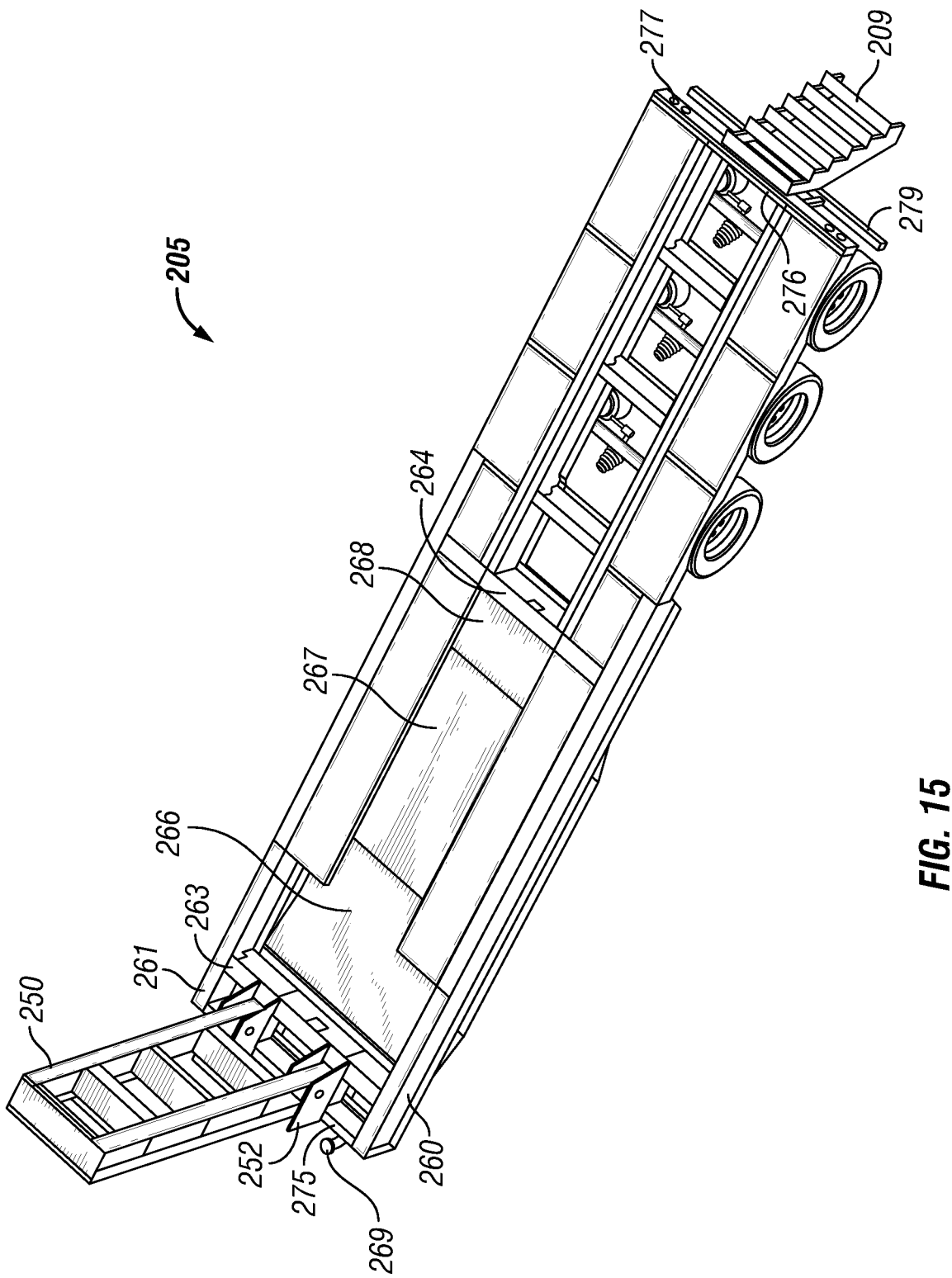
FIG. 15 is a perspective view of a chassis of a mobile hydraulic fluid delivery system.

Turning to FIG. 15, the chassis 205 of this embodiment includes (1) two opposing equidistant side frame members 260, 261 defining the length of the chassis 205 and (2) two opposing equidistant end frame members 275, 276 defining the width of the chassis 205. The frame members suitably provide a rectangular chassis 205 shape similar as known flatbed type trailers. The rear end frame member 276 may be operationally configured to receive the stairway 209 in pivotal attachment thereto. The rear end frame member 276 may also include tail lights and/or brake lights 277 as commonly provided on trailers and the like. In addition, rear end frame member 276 may also a bumper 279 as shown.

The chassis 205 may also include one or more cross support members for structural support of the chassis 205. For example, a first cross support member 263 may be included to provide added structural strength by supporting part of the pivoting beam supports 252, 253 and the pivoting beam 250 secured thereto. A second cross support member 264 may be included at about a midpoint of the chassis 205 for added structural strength at the midpoint of the chassis 205. As depicted, the inner surfaces of the frame members 260, 261 and cross support members 263, 264 suitably form a rectangular space there between for housing one or more fuel tanks of the system 100. For hydraulic fracturing operations, the system 100 suitably includes a first fuel tank 266, a second fuel tank 267 and a hydraulic oil tank 268. In another embodiment, the system 100 may include a single fuel tank. In still another embodiment, the system 100 may include three or more fuel tanks. Likewise, additional hydraulic oil tanks may be employed as desired. In the embodiment of FIG. 15, the three tanks 266, 267, 268 may be provided as a single container with baffles or partitions therein dividing the container into three separate fluid housings. In another embodiment, three tanks 266, 267, 268 may be provided as three individual tanks. Suitably, the three tanks 266, 267, 268 are secured to the frame members 260, 261 and cross support members 263, 264 via fasteners, welds, and combinations thereof. As stated above, the fuel tanks and hydraulic oil tanks of this embodiment are suitably constructed from one or more materials operationally configured for housing hydrocarbon-based fuels. Also, each tank provided as part of the system 100 may include one or more fuel fill spout type inlet 269 near the front of the chassis 205 as shown in FIG. 15—each inlet 269 suitably being set at an elevated position relative its corresponding tank 266, 267, 268.

With further reference to FIG. 15, the first side 270 of the chassis 205 includes opposing walkways or access work platforms 272, 273 attached to the opposing chassis frame members 260, 261. Work platforms 272, 273 of this embodiment are suitably planar type members providing a planar type first side 270 of the chassis 205. Likewise, work platforms 272, 273 of this embodiment may include a width effective to support one or more persons thereon for purposes of working on the system 100. For safety purposes, work platforms 272, 273 of this embodiment may include slip resistant bar grating materials, solid surfaces, perforated material, and combinations thereof as described above. Suitably, each work platform 272, 273 includes a width up to about one-third the width of the chassis 205 and a length up to about four-fifths the length of the chassis 205. In an embodiment of the system 100 for hydraulic fracturing operations performed in the United States of America, a suitable width of each work platform 272, 273 is about 60.0 cm (about 23.62 inches). In another embodiment, the work platforms 272, 273 may include dissimilar widths and/or lengths. Moreover, the work platforms 272, 273 are suitably constructed from one or more materials and have a uniform thickness effective to support the various sub-assemblies thereon. Suitable materials of construction include, but are not necessarily limited to plastic, rubber, carbon steel, stainless steel, aluminum, titanium, and combinations thereof. A suitable thickness of each of the work platforms 272, 273 is about 3.0 cm (about 1.18 inches). Each work platforms 272, 273 may be provided as a single elongated member or be comprised of two or more members. Each of the work platforms 272, 273 may be removable and/or hingedly attached to the chassis 205. One or both of the work platforms 272, 273 may also include vertical posts 172 and railing 174 as described above.

Turning to FIG. 16, a second side 271 of the chassis 205 suitably includes a protective cover (hereafter "cover plate 280") disposed across tanks 266, 267, 268 similar as described above. In another embodiment, the protective cover may be provided as one or more guard rails disposed across tanks 266, 267, 268. In another embodiment, the protective cover may be provided as a screen or cage type member disposed across tanks 266, 267, 268. In the embodiment of FIG. 16, the cover plate 280 is suitably constructed from one or more durable materials effective to protect the tanks 266, 267, 268 from contact that may result in damage such as dents, punctures, leaks, and combinations thereof. Suitable protective cover materials of construction include, but are not necessarily limited to metals, plastics, rubbers, composite materials, and combinations thereof. In one embodiment, the cover plate 280 may be provided as a planar type member constructed from one or more metals suitably, e.g., a metal sheet material, secured to the inner surfaces of the frame members 260, 261 and cross support members 263, 264 via welds, fasteners, and combinations thereof.

Figure 18:
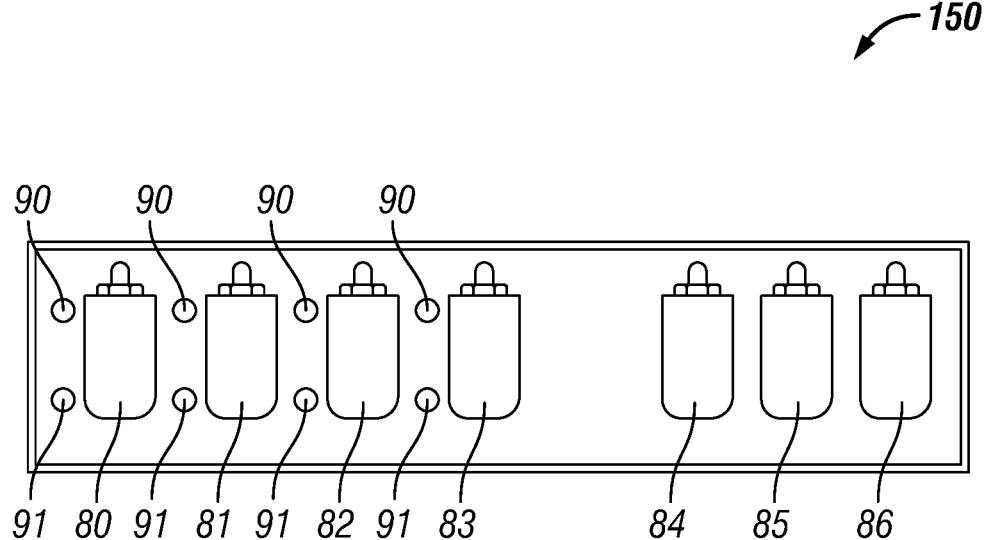
FIG. 18 is a simplified illustration of a front view of a maintenance station including exemplary content of the maintenance station.

Still referring to FIG. 16, the second side of the chassis 205 may also include a forward facing maintenance station 150 set near the front of the chassis 205 adjacent the cover plate 280. Such orientation of the maintenance station 150 provides for ease of access to various filters of the system 100, which are consolidated therein. In one suitable embodiment the maintenance station 150 may be disposed within the boundary of the frame members 260, 261 and cross support members 263, 264. Similar as above, the maintenance station 150 of this embodiment may include a box type enclosure provided with a front cover hingedly attached thereto or provided with a retractable cover. Likewise, the maintenance station 150 of this embodiment may house one or more fluid filters such as one or more (1) engine fuel filters, (2) fuel/water separators, (3) engine oil filters, (4) transmission oil filters, (5) pump lubricating oil filters, (6) hydraulic reservoir oil filters, and (7) air/water separators. As shown in FIG. 18, one suitable maintenance station 150 may house an engine oil filter 80, a hydraulic oil filter 81, a transmission oil filter 82, a pump lube oil filter 83, a fuel/water separator 84, a fuel filter 85, and an air/water separator 86.

The maintenance station 150 may also be operationally configured as an oil change station of the system 100 by providing fluid inlets and outlets for various fluids. As shown in FIG. 18, one or more pairs of oil quick connects as known in the relevant art may be provided for adding oil to the system 100 via a pressure pump and for draining oil from the system 100 via a vacuum pump. In FIG. 18, pairs of quick connects are provided corresponding to the engine oil filter 80, a hydraulic oil filter 81, a transmission oil filter 82, a pump lube oil filter 83—each pair including an inlet 90 or fill line and an outlet 91 or drain line. The arrangement of quick connects 90, 91 as seen in FIG. 18 is for illustrative purposes only. Other arrangements are herein contemplated including locating quick connects 90, 91 at locations other than the maintenance station 150. Suitably, quick connects 90, 91 are located near the front of the chassis 205 for convenient access. Accordingly, the maintenance station 150 provides a single location from which operators may fully service the system 100.

As shown in FIG. 19, the chassis 205 may include pairs of jacking legs for supporting the chassis 205 similar as known trailers. In this embodiment, the chassis 205 includes three pairs of jacking legs 285, 286, 287 on opposite sides of the chassis 205. Suitable jacking legs may include telescoping type members and/or fixed or single cylinder type members. In one embodiment, jacking legs 285 may be provided as telescoping type members to assist in providing ground clearance for the chassis 205.

Figure 20:
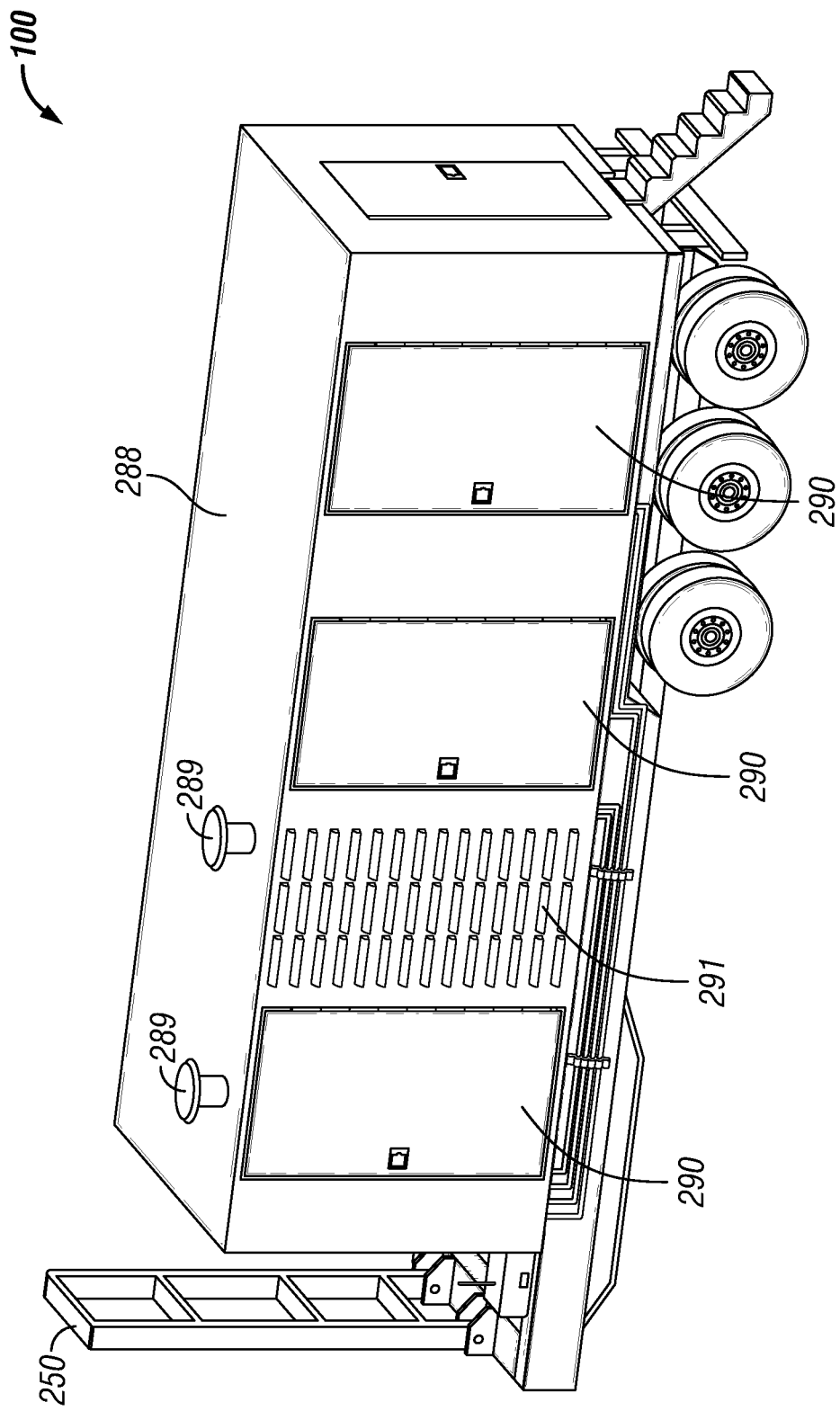
FIG. 20 is a perspective view of an embodiment of a mobile hydraulic fluid delivery system including an enclosure.

Turning to FIG. 20, the system 100 may be provided with an enclosure 288 including any combination of engine exhaust(s) 289, doors 290 and louvers 291 as desired. For purposes of sound proofing, the system 100 may be operationally configured for sound proofing one or more of the engine 120, the transmission 125 and the high pressure pump 130. In one particular embodiment the enclosure 288 may be provided as a sound proofing enclosure to lessen environmental noise generated by the system 100. For example, the inner surface of the sidewalls of the enclosure 288 may include noise control or sound deadening material as known in the art, e.g., industrial sound absorbing material or panels, sound blankets, and sound constraining aluminum composite material as commercially available from Pyrotek, Inc., Spokane, Wash., U.S.A.

For hydraulic fracturing operations, the part of the chassis 105, 205 providing structural support for the system 100 is suitably constructed from one or more metals. Suitable metals include, but are not necessarily limited to aluminum, steel, titanium, and combinations thereof. In one embodiment, the part of the chassis 105, 205 providing structural support may be constructed from stainless steel. In another embodiment, the part of the chassis 105, 205 providing structural support may be constructed from mild steel. In one particular embodiment, the part of the chassis 105, 205 providing structural support may be constructed from high tensile steel including, but not necessarily limited to high tensile AS14-T1 steel.

Suitable materials of construction of the first and second sub-assemblies 115, 116 include, but are not necessarily limited to aluminum, steel, titanium, and combinations thereof. In one particular embodiment, the first and second sub-assemblies 115, 116 may be constructed from stainless steel. In another particular embodiment, the first and second sub-assemblies 115, 116 may be constructed from mild steel. In addition, first and second sub-assemblies 115, 116 may be fabricated from framework sections or plank type members similar as other metal frame box type configurations and be assembled via bolts, welds, and combinations thereof as understood by the skilled artisan.

Suitable materials of construction of the body member 152, 153 include, but are not necessarily limited to one or more metals, glass reinforced plastic, and combinations thereof. Suitable metals include, but are not necessarily limited to stainless steel, mild steel, aluminum, and combinations thereof.

A suitable tow connection 106 may be constructed from one or more materials similar as the chassis 105. In one embodiment, a tow connection 106 may be constructed from high tensile steel and provided in the form of an I-beam, a channel section, or box type sectional member. A suitable removable stairway 109 may be constructed from one or more metals, polymeric materials, wood, composite materials, and combinations thereof. In one particular embodiment, the stairway 109 includes a frame constructed from one or more metals including, but not necessarily limited to steel, e.g., mild steel, stainless steel, aluminum, and combinations thereof. Suitable individual stair steps may be constructed from aluminum, glass reinforced plastic, plastic, expanded mesh grating, and combinations thereof.

The system 100 may also include one or more light sources 65 including individual lights and/or light strips disposed along various parts of the chassis 105 and/or sub-assemblies 115, 116 for illuminating the area on and around the system 100. One suitable light source 65 may include an incandescent bulb. Another suitable light source may include a fluorescent light. Still another suitable light source may include a light emitting diode ("LED"). One suitable light strip includes an LED light strip 65 as known in the art of LED lighting (see FIG. 5). Suitable light strips 65 may be placed horizontally, vertically and diagonally along the system 100 as desired or as otherwise required.

It further contemplated that pertinent system 100 data or information may be collected during hydraulic fracturing operations in order to monitor system 100 equipment and/or to make decisions relating to the hydraulic fracturing operations. In other words, the system 100 may be provided with cloud based remote diagnostics operationally configured to monitor operation of the engine 120, transmission 125, high pressure pump 130, radiator 140 and maintenance station 150. For example, one or more sensors may be included to capture one or more measurable parameters of the various equipment. Examples of measurable parameters include, but are not necessarily limited to engine oil pressure, engine 120 oil temperature, exhaust gas pressure, exhaust gas temperature, fuel temperature, fuel flow, fuel levels, transmission 125 temperature, high pressure pump 130 temperature, hydraulic reservoir levels, tire 107 air pressure and pump pressure, high pressure pump 130 flow rates, high pressure pump 130 lubricating pressure, high pressure pump 130 lubricating oil level, gear selector position, and complete system load. Moreover, the system 100 may include a diagnostic computer operationally configured to wirelessly transmit measurable parameters to one or more off-site operations centers and/or personal computers using diagnostics software of the system 100. The remote capability of the present system also allows off-site operations centers and the like to send data back to the system 100 on-site to reprogram settings, adjust operating parameters of various system equipment, e.g., engine 120, transmission 125, high pressure pump 130, and completely operate the system 100 remotely offsite or on-site via a data van or the like.

The system 100 may include also the installation of a remote meter or like device operationally configured to provide up to date information regarding the system 100 equipment. For example, a remote meter may be used to monitor engine 120 hours, transmission 125 hours, high pressure pump 130 hours, engine 120 oil pressure, engine 120 oil temperature, exhaust gas pressure, exhaust gas temperature, fuel temperature, fuel flow, fuel level, transmission 125 temperature, high pressure pump 130 temperature, hydraulic reservoir levels, tire air pressure, pump 130 lubricating pressure, pump 130 lubricating oil level, gear selector position, and complete system load. Remote meters may also be implemented to gather data to conduct real-time analysis of data for performance analysis, component failure prediction and other information. For example, the fluid pressure and/or fluid flow rate of the high pressure pump 130 may be monitored and adjusted remotely using controllers installed as part of the system 100. In another embodiment, one or more local controllers (not shown) may be installed on or near the forward part of the chassis 105 effective for local monitoring and control of the system 100 during fracturing operations.

The system 100 may also employ SMART technology and telemetry effective to enhance maintainability and operability of the system 100, and in addition to field-viewing capabilities, provide full remote-viewing capabilities, e.g., remote diagnostics, location tracking and performance monitoring via one or more remote control centers. In one embodiment, the system 100 may include a full data telemetry system or telemetry package 610, e.g., a bolt on unit mounted on the chassis 205, or other system 100 equipment, which is operationally configured to read and transmit all data of the system 100 via wireless network, cellular network, satellite network, and combinations thereof. In particular, a suitable telemetry package 610 provides (1) remote monitoring of one or more system 100 parameters, (2) system upgrades of the system 100 including software updates that may be performed remotely and (3) data including, but not necessarily limited to tracking of the location, performance and operational status of the system 100. If a user of the system 100 is at a location out of range for remote operation, the telemetry package 610 is operationally configured to save or store data for retrieval at a later time.

The system 100 may also include a fire suppressant system consisting of CO2 or nitrogen (N2) containers or bottles located at or near the chassis 205 and fluidly connected via a network of fluid conduit, e.g., piping, provide fluid outlets, e.g., sprinklers, at one or more target areas of the system 100, including, but not necessarily limited to the engine 120, one or more fuel tanks described above, the transmission 125, and the high pressure pump 130. In one mode of operation, the fire suppressant system of this application functions in a manner similar as a fire suppressant system of a dwelling or other building. For purposes of this application, the fire suppressant system may be electronically communicated with control circuitry of the system 100 and controlled remotely.

The invention will be discussed with reference to the following non-limiting examples, which are illustrative only and not intended to limit the present invention to a particular embodiment.

Example 1

With attention to FIG. 10, one non-limiting embodiment of the system 100 may include the following design characteristics:
Chassis 105: —Two main parallel support beams constructed from high tensile steel, mild steel, or aluminum.
Support surface 112 material constructed from high tensile steel, mild steel, or aluminum.
Opposing body members 152, 153 constructed from mild steel, aluminum, or glass reinforced plastic.
Two fuel tanks, each constructed from stainless steel and having a volume from about 200.0 liters (52.83 gallons) to about 2500.0 liters (660.4 gallons).
Axle system using air ride suspension from Meritor, Inc., Troy, Mich.
Total of 8, 12 or 16 tires
Dimensions: Height: 1.5 meters (4.92 feet)
Width: 2.62 meters (8.6 feet)
Length: 10.66 meters (35.0 feet)
Engine 120: —Caterpillar 3512C HD SCAC; Cummins QSK50 (optional); MTU 12V4000 (optional)
2500 BHP @1950 RPM
Emissions Certified
Heavy duty air cleaners
Hydraulic starting system
24-volt/60 amp charging system
Transmission 125: —Caterpillar TH55-E70 7 speed automatic; Caterpillar TH55-E90 9 speed (optional); Allison 9800 OFS or equivalent (optional)
Rated 2500 HP/7020 ft/lb torque
Two external heat exchangers
Pump 130: —SPM QS2500 from Weir; GD-3000 from Gardner Denver (optional):
or equivalent
Cooling System: Includes a horizontal radiator 140 and pre-radiator filter member as described above
System 100 dimensions: Height: 4.41 meters (14.5 feet)
Width: 2.62 meters (8.6 feet)
Length: 10.66 meters (35.0 feet)
System 100 total weight: about 38.555 kg (85,000.0 pounds)

Example 2

Figure 22:
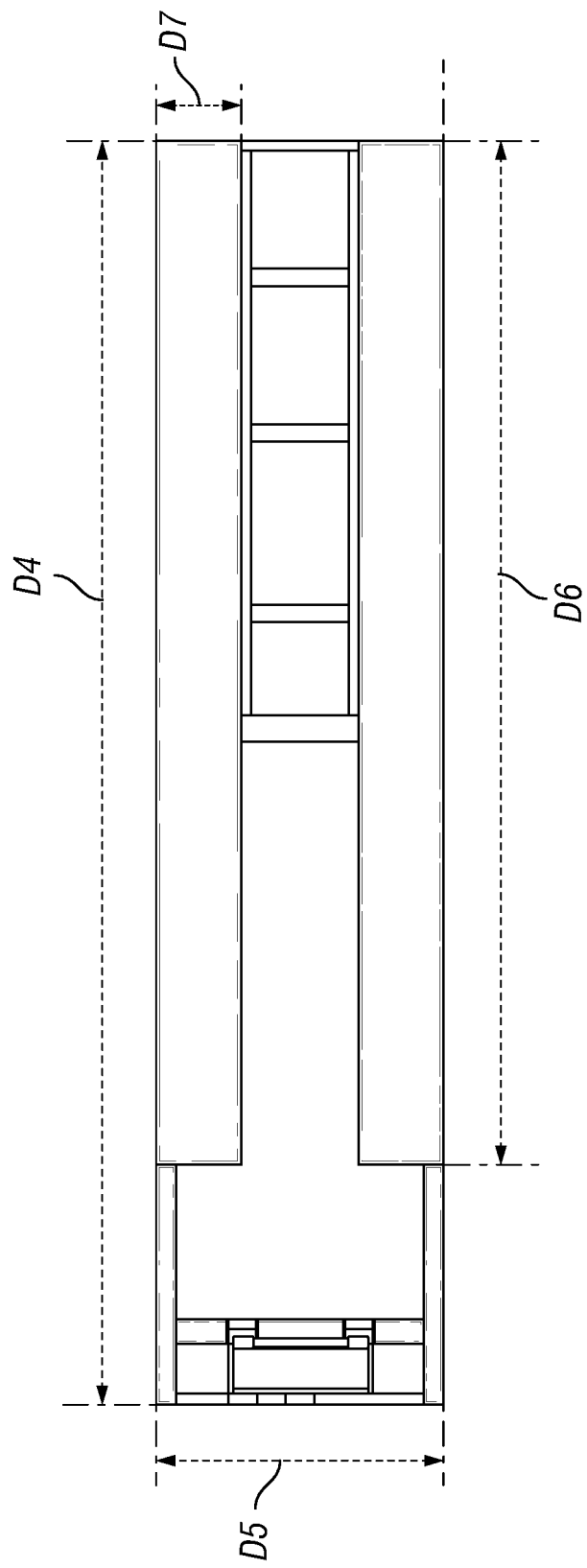
FIG. 22 is a top view of an embodiment of a chassis of the present application.

With reference to FIGS. 21 and 22, a chassis 205 may be provided having the following dimensions:
D1: 121.92 cm (48.0 inches)
D2: 375.92 cm (148.0 inches)
D3: 45.72 cm (18.0 inches)
D4: 1148.28 cm (452.08 inches)
D5: 259.08 cm (102.0 inches)
D6: 1069.31 cm (420.99 inches)
D7: 60.96 cm (24.0 inches)

It is believed that present application and advantages will be understood by the forgoing description. Persons of ordinary skill in the art will recognize that many modifications may be made to the present application without departing from the spirit and scope of the invention. The embodiment(s) described herein are meant to be illustrative only and should not be taken as limiting the invention, which is defined in the claims.

I claim:

1. A mobile hydraulic fluid delivery system including:
a chassis having a perimeter framework providing a support surface on a first side of the chassis;
a tow connection pivotally attached to a front end of the chassis between a vertical position and a non-vertical position;
a power sub-assembly located on the support surface and releasably securable to the chassis;
a pump sub-assembly located on the support surface and releasably securable to the chassis; and
a cooling sub-assembly located on the support surface and releasably securable to the chassis;
wherein the chassis includes a second side with a maintenance station attached thereto, the maintenance station including one or more fluid filters of the system.

2. The system of claim 1, wherein the power sub-assembly includes an engine and a transmission, the pump sub-assembly includes a high pressure pump and the cooling sub-assembly includes a plurality of radiators at an elevated position above the chassis including at least one radiator located above the high pressure pump.

3. The system of claim 2, further including one or more fuel tanks located within the perimeter of the chassis below the support surface.

4. The system of claim 3, wherein the second side of the chassis includes a protective cover disposed across the one or more fuel tanks.

5. The system of claim 1, further including an air cooler located between the tow connection and the power sub-assembly.

6. The system of claim 5, further including an air deflector located between the air cooler and the tow connection.

7. The system of claim 1, wherein the maintenance station comprises an enclosure housing the one or more fluid filters of the system therein, wherein the one or more fluid filters of the system include an engine oil filter, a hydraulic oil filter, a transmission oil filter, a pump lube oil filter, a fuel/water separator, a fuel filter, and an air/water separator therein.

8. The system of claim 1, wherein the maintenance station includes one or more pairs of oil quick connects, each pair having an oil inlet and an oil outlet for a particular type of oil of the system.

9. The system of claim 2, wherein the pump sub-assembly is operationally configured to receive two or more different sized high pressure pumps in releasable attachment thereto.

10. The system of claim 1, wherein the system includes a total weight and the tow connection accounts for about ten percent to about twenty-five percent of the total weight.

11. The system of claim 1, wherein the chassis includes two or more rear axles, each of the rear axles realizing a first rear axle weight when the tow connection is set at the vertical position and realizing a second rear axle weight less than the first axle weight when the tow connection is set at the non-vertical position.

12. The system of claim 1, further including a sound proofing enclosure, wherein the power sub-assembly, the pump sub-assembly and the cooling sub-assembly are located within the sound proofing enclosure.

13. The system of claim 1, wherein the chassis further includes pairs of jacking legs.

14. A mobile hydraulic fluid delivery system including:
a chassis comprising a support surface on a first side of the chassis, and a second side facing away from the first side,
a power sub-assembly releasably securable to the first side of the chassis,
a pump sub-assembly releasably securable to the chassis,
a cooler sub-assembly releasably securable to the chassis, and
a maintenance station attached to the second side of the chassis, the maintenance station including one or more fluid filters of the system,
wherein the power sub-assembly includes an engine and a transmission, the pump sub-assembly includes a high pressure pump, and the cooler sub-assembly includes a plurality of radiators including a radiator boated above the power sub-assembly and at least one radiator boated above the pump sub-assembly.

15. The system of claim 14, further including a tow connection pivotally attached to the chassis between a vertical position and a non-vertical position, wherein the system includes a total weight and the weight of the tow connection accounts for about 9.0 to about 15.0 percent the total weight of the system.

16. A mobile hydraulic fluid delivery system including:
a towable platform defined by a front end, a rear end, a first side and an opposing second side;
a first sub-assembly releasably securable to the first side of the towable platform, the first sub-assembly including at least an engine and a transmission in operable communication;
a second sub-assembly releasably securable to the first side of the towable platform, the second sub-assembly including a high pressure pump, wherein the second sub-assembly is in operable communication with the first sub-assembly;
a third sub-assembly releasably securable to the first side of the towable platform, the third sub-assembly including a plurality of radiators in operable communication with the first and second sub-assemblies; and
a maintenance station attached to the opposing second side of the towable platform, the maintenance station including one or more fluid filters of the system;
wherein the second sub-assembly and third sub-assembly are about equidistant from the rear end of the towable platform;
wherein at least part of the third sub-assembly is nearer the front end of the towable platform than the second sub-assembly; and
wherein at least part of the third sub-assembly is nearer the front end of the towable platform than part of the first sub-assembly.

17. The system of claim 16, wherein the maintenance station comprises an enclosure housing the one or more fluid filters of the system therein, wherein the one or more fluid filters of the system include an engine oil filter; a hydraulic oil filter, a transmission oil filter, a pump lube oil filter, a fuel/water separator, a fuel filter, and an air/water separator.

* * * * *